US008786907B2

(12) United States Patent
Yamazaki

(10) Patent No.: US 8,786,907 B2
(45) Date of Patent: Jul. 22, 2014

(54) IMAGE PROCESSING APPARATUS, CONTROL METHOD OF IMAGE PROCESSING APPARATUS, IMAGE FORMING APPARATUS, AND STORAGE MEDIUM

(71) Applicant: Canon Kabushiki Kaisha, Tokyo (JP)

(72) Inventor: Hiroyuki Yamazaki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/851,455

(22) Filed: Mar. 27, 2013

(65) Prior Publication Data

US 2013/0265613 A1 Oct. 10, 2013

(30) Foreign Application Priority Data

Apr. 6, 2012 (JP) ................................ 2012-087929

(51) Int. Cl.
*G06K 15/00* (2006.01)
*H04N 1/40* (2006.01)

(52) U.S. Cl.
USPC .......... 358/3.06; 358/3.22; 358/1.9; 382/275; 399/181; 348/254

(58) Field of Classification Search
CPC . H04N 1/4052; H04N 1/4053; H04N 1/4055; H04N 1/40087; H04N 1/3935; H04N 1/405; H04N 1/4058; H04N 1/40062; H04N 1/4051; H04N 1/409; H04N 5/70; H04N 9/30
USPC ............ 358/3.03, 3.05, 3.13, 3.06, 3.2, 3.21, 358/2.1, 3.01, 3.17, 1.2, 3.14, 3.15, 3.02, 358/3.09, 3.1, 3.12, 163.19, 3.22, 3.23, 528, 358/533; 382/252, 270, 275, 272, 237, 251; 348/E5.135, E9.024, 254; 399/180, 399/381
See application file for complete search history.

(56) References Cited

U.S. PATENT DOCUMENTS 5,121,446 A * 6/1992 Yamada et al. ............... 382/272
6,731,817 B2 * 5/2004 Shibaki et al. ................ 382/252

(Continued)

FOREIGN PATENT DOCUMENTS

JP 08-251430 A 9/1996
JP 2003-241131 A 8/2003

(Continued)

OTHER PUBLICATIONS

U.S. Appl. No. 13/854,846, filed Apr. 1, 2013, by Satoshi Nakashima.

*Primary Examiner* — Negussie Worku
(74) *Attorney, Agent, or Firm* — Fitzpatrick, Cella, Harper & Scinto

(57) ABSTRACT

When an image processing apparatus of one aspect of this invention corrects input image data using correction values (misregistration correction amounts Δy), it determines whether or not image data to be corrected using amounts Δy includes a specific pattern which may cause density unevenness in an image to be formed. When the image processing apparatus determines that the image data includes the specific pattern, it modifies amounts Δy corresponding to pixels including the specific pattern of the amounts Δy using any of a plurality of different predetermined modulation amounts (modification values). Furthermore, the image processing apparatus corrects the image data for respective pixels using either the amounts Δy before modification, or the modified amounts Δy when the modification is done.

13 Claims, 23 Drawing Sheets

(56) References Cited

U.S. PATENT DOCUMENTS

| | | | | |
|---|---|---|---|---|
| 7,097,270 | B2 | 8/2006 | Yamazaki | |
| 7,106,476 | B1 * | 9/2006 | Tonami et al. | 358/1.9 |
| 7,224,488 | B2 * | 5/2007 | Inoue | 358/3.13 |
| 7,426,352 | B2 * | 9/2008 | Moriyama et al. | 399/43 |
| 7,636,179 | B2 * | 12/2009 | Takahashi et al. | 358/3.05 |
| 7,760,400 | B2 * | 7/2010 | Ishii et al. | 358/3.22 |
| 8,027,063 | B2 | 9/2011 | Maebashi | |
| 8,130,410 | B2 * | 3/2012 | Gotoh | 358/1.2 |
| 8,208,175 | B2 * | 6/2012 | Xu et al. | 358/3.06 |
| 8,587,836 | B2 * | 11/2013 | Araki et al. | 358/3.26 |
| 8,610,962 | B2 * | 12/2013 | Fischer et al. | 358/3.26 |
| 2011/0216379 | A1 | 9/2011 | Arakawa | |

FOREIGN PATENT DOCUMENTS

| | | | |
|---|---|---|---|
| JP | 2004-170755 | A | 6/2004 |
| JP | 2007-279429 | A | 10/2007 |
| JP | 2007-316154 | A | 12/2007 |
| JP | 2009-056647 | A | 3/2009 |
| JP | 2009-294381 | A | 12/2009 |
| JP | 2011-180446 | A | 9/2011 |

* cited by examiner

| MAIN SCANNING POSITION | MISREGISTRATION AMOUNT |
| --- | --- |
| -L1 | 0 |
| 0 | eY1 |
| L2 | eY2 |

FIG. 7A
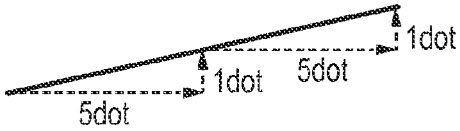
FIG. 7B
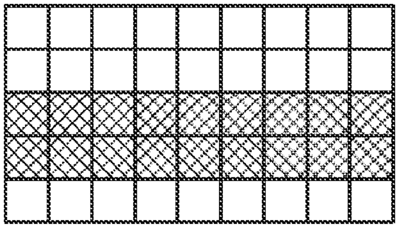
FIG. 7C
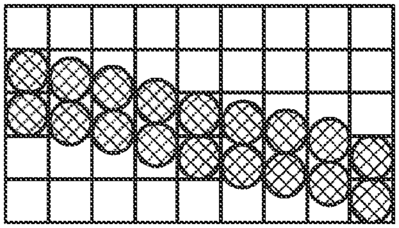
FIG. 7D
| | | | | | | | | | |
|---|---|---|---|---|---|---|---|---|---|
| Δy | 0 | 0.25 | 0.5 | 0.75 | 1 | 1.25 | 1.5 | 1.75 | 2 |
| k | 0 | 0 | 0 | 0 | 1 | 1 | 1 | 1 | 2 |
| β=Δy−k | 0 | 0.25 | 0.5 | 0.75 | 0 | 0.25 | 0.5 | 0.75 | 0 |
| α=1−β | 1 | 0.75 | 0.5 | 0.25 | 1 | 0.75 | 0.5 | 0.25 | 1 |
FIG. 7E
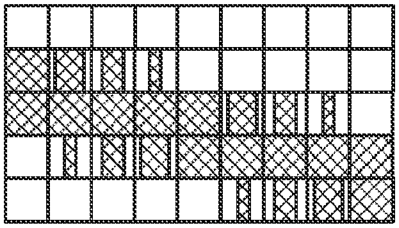
FIG. 7F
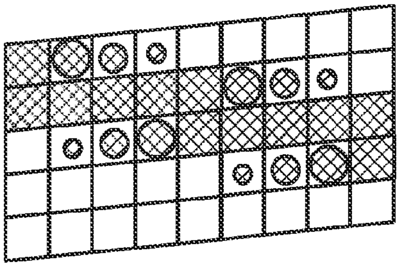

| Y0 | Y1 | Y2 | Y3 | Y4 |
|---|---|---|---|---|
| 0 | 0 | 1 | 1 | 7 |
| 255 | 1 | 0 | 1 | 7 |
| 255 | 0 | 0 | 0 | 8 |
| 255 | 0 | 0 | 0 | 8 |
| 255 | 0 | 1 | 1 | 7 |
| 0 | 1 | 0 | 1 | 7 |
| 0 | 0 | 0 | 0 | 8 |
| 0 | 0 | 1 | 1 | 7 |
| 255 | 1 | 0 | 1 | 7 |
| 255 | 0 | 0 | 0 | 8 |
| 255 | 0 | 0 | 0 | 8 |
| 255 | 0 | 1 | 1 | 7 |
| 0 | 1 | 0 | 1 | 7 |
| 0 | 0 | 0 | 0 | 8 |
| 0 | 0 | 1 | 1 | 7 |
| 255 | 1 | 0 | 1 | 7 |
| 255 | 0 | 0 | 0 | 8 |
| 255 | 0 | 0 | 0 | 8 |
| 255 | 0 | 1 | 1 | 7 |
| 0 | 1 | 0 | 1 | 7 |

| DATA | ADDRESS | MODULATION AMOUNT |
|---|---|---|
| d1 | 0 | 0 |
| d2 | 1 | −0.5 |
| d3 | 2 | 0.25 |
| d4 | 3 | 0 |
| d5 | 4 | 0.5 |
| d6 | 5 | −0.25 |

FIG. 13

1301 (table1)

| | | | |
|---|---|---|---|
| 226 | 61 | 121 | 181 |
| 166 | 1 | 16 | 76 |
| 106 | 31 | 46 | 136 |
| 211 | 151 | 91 | 196 |

1302 (table2)

| | | | |
|---|---|---|---|
| 227 | 62 | 122 | 182 |
| 167 | 2 | 17 | 77 |
| 107 | 32 | 47 | 137 |
| 212 | 152 | 92 | 197 |

:

1315 (table15)

| | | | |
|---|---|---|---|
| 240 | 75 | 135 | 195 |
| 180 | 15 | 30 | 90 |
| 120 | 45 | 60 | 150 |
| 225 | 165 | 105 | 210 |

FIG. 14

| | | | | | | | | | | | |
|---|---|---|---|---|---|---|---|---|---|---|---|
| 0 | 0 | 0 | 0 | 0 | 0 | 0 | 0 | 0 | 0 | 0 | 0 |
| 0 | 15 | 15 | 0 | 0 | 15 | 15 | 0 | 0 | 15 | 15 | 0 |
| 0 | 15 | 8 | 0 | 0 | 15 | 8 | 0 | 0 | 15 | 8 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 15 | 15 | 0 | 0 | 15 | 15 | 0 | 0 | 15 | 15 | 0 |
| 0 | 15 | 8 | 0 | 0 | 15 | 8 | 0 | 0 | 15 | 8 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 15 | 15 | 0 | 0 | 15 | 15 | 0 | 0 | 15 | 15 | 0 |
| 0 | 15 | 8 | 0 | 0 | 15 | 8 | 0 | 0 | 15 | 8 | 0 |
| 0 | 0 | 0 | 0 | 0 | 0 | 0 | 0 | 0 | 0 | 0 | 0 |

FIG. 15A

| | | | | | | | | | | | | | | |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 100 | 100 | 100 | 100 | 100 | 100 | 100 | 100 | 100 | 100 | 100 | 100 | 100 | 100 | 100 |
| 100 | 100 | 100 | 100 | 100 | 100 | 100 | 100 | 100 | 100 | 100 | 100 | 100 | 100 | 100 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG. 15B

| | | | | | | | | |
|---|---|---|---|---|---|---|---|---|
| Δy | 0 | 0.01 | 0.02 | 0.03 | 0.04 | 0.05 | 0.06 | 0.07 |

| | | | | | | | |
|---|---|---|---|---|---|---|---|
| 0 | 0 | 0 | 0 | 0 | 0 | 0 | 0 |
| 100 | 99 | 98 | 97 | 96 | 95 | 94 | 93 |
| 100 | 100 | 100 | 100 | 100 | 100 | 100 | 100 |
| 0 | 1 | 2 | 3 | 4 | 5 | 6 | 7 |
| 0 | 0 | 0 | 0 | 0 | 0 | 0 | 0 |

FIG. 15C

| | | | | | | | |
|---|---|---|---|---|---|---|---|
| 0.47 | 0.48 | 0.49 | 0.50 | 0.51 | 0.52 | 0.53 | 0.54 |

| | | | | | | | |
|---|---|---|---|---|---|---|---|
| 0 | 0 | 0 | 0 | 0 | 0 | 0 | 0 |
| 53 | 52 | 51 | 50 | 49 | 48 | 47 | 46 |
| 100 | 100 | 100 | 100 | 100 | 100 | 100 | 100 |
| 47 | 48 | 49 | 50 | 51 | 52 | 53 | 54 |
| 0 | 0 | 0 | 0 | 0 | 0 | 0 | 0 |

FIG. 15D

| | | | | | | | | |
|---|---|---|---|---|---|---|---|---|
| Δy (BEFORE MODULATION AMOUNT ADDITION) | 0 | 0.01 | 0.02 | 0.03 | 0.04 | 0.05 | 0.06 | 0.07 |
| MODULATION AMOUNT | 0 | −0.5 | 0.25 | 0 | 0.5 | −0.25 | 0 | −0.5 |
| Δy (AFTER MODULATION AMOUNT ADDITION) | 0 | −0.49 | 0.27 | 0.03 | 0.54 | −0.20 | 0.06 | −0.43 |

| | | | | | | | |
|---|---|---|---|---|---|---|---|
| 0 | 49 | 0 | 0 | 0 | 20 | 0 | 43 |
| 100 | 100 | 73 | 97 | 46 | 100 | 94 | 100 |
| 100 | 51 | 100 | 100 | 100 | 80 | 100 | 57 |
| 0 | 0 | 27 | 3 | 54 | 0 | 6 | 0 |
| 0 | 0 | 0 | 0 | 0 | 0 | 0 | 0 |

FIG. 15E

| | | | | | | | |
|---|---|---|---|---|---|---|---|
| 0.47 | 0.48 | 0.49 | 0.50 | 0.51 | 0.52 | 0.53 | 0.54 |
| 0 | −0.5 | 0.25 | 0 | 0.5 | −0.25 | 0 | −0.5 |
| 0.47 | −0.02 | 0.74 | 0.50 | 1.01 | 0.27 | 0.53 | 0.04 |

| | | | | | | | |
|---|---|---|---|---|---|---|---|
| 0 | 2 | 0 | 0 | 0 | 0 | 0 | 0 |
| 53 | 100 | 26 | 50 | 0 | 73 | 47 | 96 |
| 100 | 98 | 100 | 100 | 99 | 100 | 100 | 100 |
| 47 | 0 | 74 | 50 | 100 | 27 | 53 | 4 |
| 0 | 0 | 0 | 0 | 1 | 0 | 0 | 0 |

FIG. 16A

| | | | | | | |
|---|---|---|---|---|---|---|
| 0 | 0 | 0 | 0 | 0 | 0 | 0 |
| 0 | 100 | 0 | 0 | 0 | 100 | 0 |
| 0 | 0 | 0 | 0 | 0 | 0 | 0 |
| 0 | 0 | 0 | 100 | 0 | 0 | 0 |
| 0 | 0 | 0 | 0 | 0 | 0 | 0 |
| 0 | 100 | 0 | 0 | 0 | 100 | 0 |
| 0 | 0 | 0 | 0 | 0 | 0 | 0 |

FIG. 16B

| Δy | 0 | 0.01 | 0.02 | 0.03 | 0.04 | 0.05 | 0.06 |
|---|---|---|---|---|---|---|---|

| | | | | | | |
|---|---|---|---|---|---|---|
| 0 | 0 | 0 | 0 | 0 | 0 | 0 |
| 0 | 99 | 0 | 0 | 0 | 95 | 0 |
| 0 | 1 | 0 | 0 | 0 | 5 | 0 |
| 0 | 0 | 0 | 97 | 0 | 0 | 0 |
| 0 | 0 | 0 | 3 | 0 | 0 | 0 |
| 0 | 99 | 0 | 0 | 0 | 95 | 0 |
| 0 | 1 | 0 | 0 | 0 | 5 | 0 |

FIG. 16C

| 0.47 | 0.48 | 0.49 | 0.50 | 0.51 | 0.52 | 0.53 |
|---|---|---|---|---|---|---|

| | | | | | | |
|---|---|---|---|---|---|---|
| 0 | 0 | 0 | 0 | 0 | 0 | 0 |
| 0 | 52 | 0 | 0 | 0 | 48 | 0 |
| 0 | 48 | 0 | 0 | 0 | 52 | 0 |
| 0 | 0 | 0 | 50 | 0 | 0 | 0 |
| 0 | 0 | 0 | 50 | 0 | 0 | 0 |
| 0 | 52 | 0 | 0 | 0 | 48 | 0 |
| 0 | 48 | 0 | 0 | 0 | 52 | 0 |

FIG. 16D

| | | | | | | | |
|---|---|---|---|---|---|---|---|
| Δy (BEFORE MODULATION AMOUNT ADDITION) | 0 | 0.01 | 0.02 | 0.03 | 0.04 | 0.05 | 0.06 |
| MODULATION AMOUNT | 0 | −0.5 | 0.25 | 0 | 0.5 | −0.25 | 0 |
| Δy (AFTER MODULATION AMOUNT ADDITION) | 0 | −0.49 | 0.27 | 0.03 | 0.54 | −0.20 | 0.06 |

| | | | | | | |
|---|---|---|---|---|---|---|
| 0 | 49 | 0 | 0 | 0 | 20 | 0 |
| 0 | 51 | 0 | 0 | 0 | 80 | 0 |
| 0 | 0 | 0 | 0 | 0 | 0 | 0 |
| 0 | 0 | 0 | 97 | 0 | 0 | 0 |
| 0 | 49 | 0 | 3 | 0 | 20 | 0 |
| 0 | 51 | 0 | 0 | 0 | 80 | 0 |
| 0 | 0 | 0 | 0 | 0 | 0 | 0 |

FIG. 16E

| | | | | | | | |
|---|---|---|---|---|---|---|---|
| Δy (BEFORE MODULATION AMOUNT ADDITION) | 0.47 | 0.48 | 0.49 | 0.50 | 0.51 | 0.52 | 0.53 |
| MODULATION AMOUNT | 0 | −0.5 | 0.25 | 0 | 0.5 | −0.25 | 0 |
| Δy (AFTER MODULATION AMOUNT ADDITION) | 0.47 | −0.02 | 0.74 | 0.50 | 1.01 | 0.27 | 0.53 |

| | | | | | | |
|---|---|---|---|---|---|---|
| 0 | 2 | 0 | 0 | 0 | 0 | 0 |
| 0 | 98 | 0 | 0 | 0 | 73 | 0 |
| 0 | 0 | 0 | 0 | 0 | 27 | 0 |
| 0 | 0 | 0 | 50 | 0 | 0 | 0 |
| 0 | 2 | 0 | 50 | 0 | 0 | 0 |
| 0 | 98 | 0 | 0 | 0 | 73 | 0 |
| 0 | 0 | 0 | 0 | 0 | 27 | 0 |

FIG. 17A

| Δy | 0 | 0.01 | 0.02 | 0.03 | 0.04 | 0.05 | 0.06 | 0.07 |
|---|---|---|---|---|---|---|---|---|
| | 0 | 0 | 0 | 0 | 0 | 0 | 0 | 0 |
| | 100 | 99 | 98 | 97 | 96 | 95 | 94 | 93 |
| | 100 | 100 | 100 | 100 | 100 | 100 | 100 | 100 |
| | 0 | 1 | 2 | 3 | 4 | 5 | 6 | 7 |
| | 0 | 0 | 0 | 0 | 0 | 0 | 0 | 0 |

FIG. 17B

| Δy | 0.28 | 0.29 | 0.30 | 0.31 | 0.32 | 0.33 | 0.34 | 0.35 |
|---|---|---|---|---|---|---|---|---|
| | 0 | 0 | 0 | 0 | 0 | 0 | 0 | 0 |
| | 72 | 71 | 70 | 69 | 68 | 67 | 66 | 65 |
| | 100 | 100 | 100 | 100 | 100 | 100 | 100 | 100 |
| | 28 | 29 | 30 | 31 | 32 | 33 | 34 | 35 |
| | 0 | 0 | 0 | 0 | 0 | 0 | 0 | 0 |

FIG. 17C

| | | | | | | | |
|---|---|---|---|---|---|---|---|
| 0 | 0 | 0 | 0 | 0 | 0 | 0 | 0 |
| 15 | 15 | 15 | 15 | 15 | 15 | 15 | 15 |
| 15 | 15 | 15 | 15 | 15 | 15 | 15 | 15 |
| 0 | 0 | 0 | 0 | 0 | 0 | 0 | 0 |
| 0 | 0 | 0 | 0 | 0 | 0 | 0 | 0 |

FIG. 17D

| | | | | | | | |
|---|---|---|---|---|---|---|---|
| 0 | 0 | 0 | 0 | 0 | 0 | 0 | 0 |
| 15 | 15 | 14 | 11 | 8 | 6 | 3 | 1 |
| 15 | 15 | 15 | 15 | 15 | 15 | 15 | 15 |
| 0 | 0 | 0 | 0 | 0 | 0 | 0 | 0 |
| 0 | 0 | 0 | 0 | 0 | 0 | 0 | 0 |

FIG. 18

| DATA | ADDRESS | MODULATION AMOUNT |
|---|---|---|
| d1 | 0 | 0 |
| d2 | 1 | 0.5 |
| d3 | 2 | 0 |
| d4 | 3 | −0.5 |

FIG. 20A 2001 2002 2003 2004

| | | | | | | | | |
|---|---|---|---|---|---|---|---|---|
| 0 | 0 | 0 | 0 | 0 | 0 | 0 | 0 | 0 |
| 0 | 100 | 0 | 100 | 0 | 100 | 0 | 100 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 100 | 0 | 100 | 0 | 100 | 0 | 100 | 0 |
| 0 | 0 | 0 | 0 | 0 | 0 | 0 | 0 | 0 |

2005 2006 2007 2008

FIG. 20B

| | | | | | | | | | |
|---|---|---|---|---|---|---|---|---|---|
| Δy (BEFORE MODULATION AMOUNT ADDITION) | 0 | 0.01 | 0.02 | 0.03 | 0.04 | 0.05 | 0.06 | 0.07 | 0.08 |

FIG. 20C

| | | | | | | | | |
|---|---|---|---|---|---|---|---|---|
| 0 | 0 | 0 | 0 | 0 | 0 | 0 | 43 | 0 |
| 0 | 99 | 0 | 47 | 0 | 95 | 0 | 57 | 0 |
| 0 | 1 | 0 | 53 | 0 | 5 | 0 | 0 | 0 |
| 0 | 0 | 0 | 0 | 0 | 0 | 0 | 0 | 0 |
| 0 | 0 | 0 | 0 | 0 | 0 | 0 | 43 | 0 |
| 0 | 99 | 0 | 47 | 0 | 95 | 0 | 57 | 0 |
| 0 | 1 | 0 | 53 | 0 | 5 | 0 | 0 | 0 |

FIG. 22A
| | | | | | | | | | | |
|---|---|---|---|---|---|---|---|---|---|---|
| 0 | 0 | 0 | 0 | 0 | 0 | 0 | 0 | 0 | 0 | 0 |
| 100 | 100 | 100 | 100 | 100 | 100 | 100 | 100 | 100 | 100 | 100 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
FIG. 22B
| SCANNING POSITION | p0 | p1 | p2 | p3 | p4 | p5 | p6 | p7 | p8 | p9 | p10 |
|---|---|---|---|---|---|---|---|---|---|---|---|
| | 0 | 0 | 0 | 0 | 0 | 0 | 0 | 0 | 0 | 0 | 0 |
| | 100 | 90 | 80 | 70 | 60 | 50 | 40 | 30 | 20 | 10 | 0 |
| | 0 | 10 | 20 | 30 | 40 | 50 | 60 | 70 | 80 | 90 | 100 |
| | 0 | 0 | 0 | 0 | 0 | 0 | 0 | 0 | 0 | 0 | 0 |
FIG. 22C
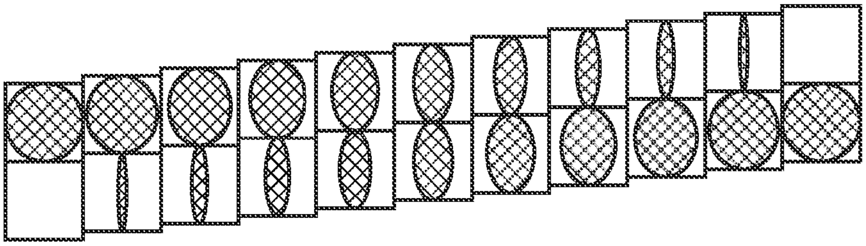
FIG. 22D
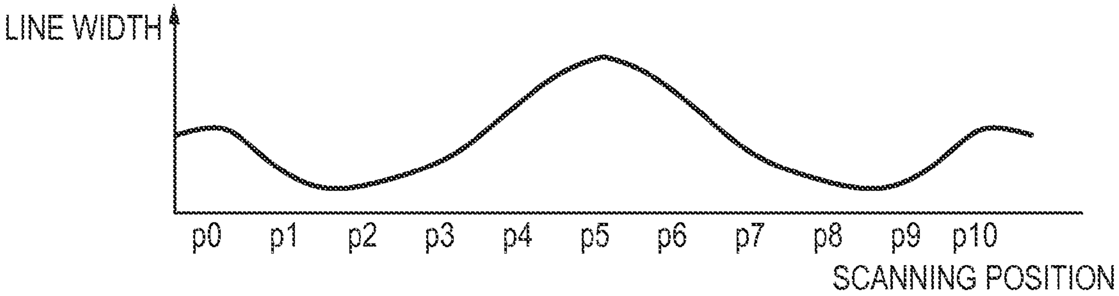

F I G. 23A
| | | | | | | | | | | |
|---|---|---|---|---|---|---|---|---|---|---|
| 0 | 0 | 0 | 0 | 100 | 100 | 0 | 0 | 0 | 0 | 100 |
| 0 | 0 | 100 | 100 | 0 | 0 | 0 | 0 | 100 | 100 | 0 |
| 100 | 100 | 0 | 0 | 0 | 0 | 100 | 100 | 0 | 0 | 0 |
| 0 | 0 | 0 | 0 | 100 | 100 | 0 | 0 | 0 | 0 | 100 |
| 0 | 0 | 100 | 100 | 0 | 0 | 0 | 0 | 100 | 100 | 0 |
| 100 | 100 | 0 | 0 | 0 | 0 | 100 | 100 | 0 | 0 | 0 |
F I G. 23B
| SCANNING POSITION | p0 | p1 | p2 | p3 | p4 | p5 | p6 | p7 | p8 | p9 | p10 |
|---|---|---|---|---|---|---|---|---|---|---|---|
| | 0 | 10 | 0 | 0 | 60 | 50 | 40 | 30 | 0 | 0 | 0 |
| | 0 | 0 | 80 | 70 | 40 | 50 | 0 | 0 | 20 | 10 | 100 |
| | 100 | 90 | 20 | 30 | 0 | 0 | 40 | 30 | 80 | 90 | 0 |
| | 0 | 10 | 0 | 0 | 60 | 50 | 60 | 70 | 0 | 0 | 0 |
| | 0 | 0 | 80 | 70 | 40 | 50 | 0 | 0 | 20 | 10 | 100 |
| | 100 | 90 | 20 | 30 | 0 | 0 | 40 | 30 | 80 | 90 | 0 |
F I G. 23C
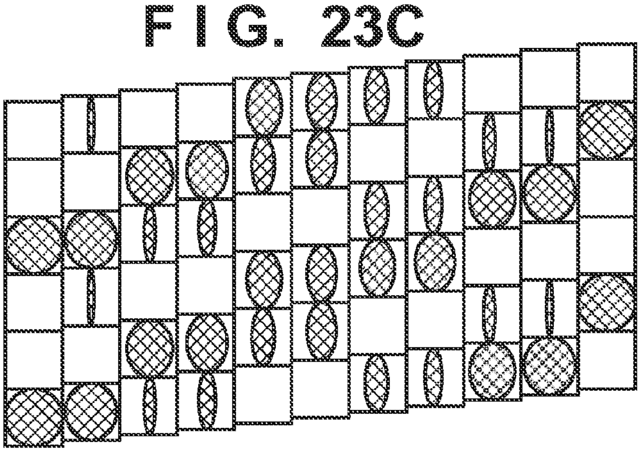
F I G. 23D
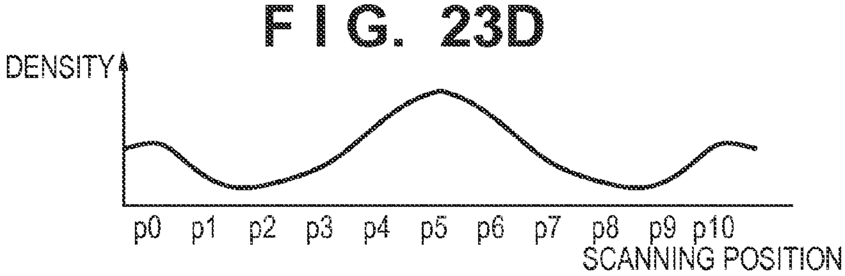

IMAGE PROCESSING APPARATUS, CONTROL METHOD OF IMAGE PROCESSING APPARATUS, IMAGE FORMING APPARATUS, AND STORAGE MEDIUM

BACKGROUND OF THE INVENTION

1. Field of the Invention

The present invention relates to an image processing apparatus, a control method of an image processing apparatus, an image forming apparatus, and a storage medium.

2. Description of the Related Art

In recent years, image quality enhancement of an output image and speeding-up of image formation are required more than ever for image forming apparatuses such as printers and copying machines which adopt an electrophotography system, inkjet system, and the like. Especially, in case of a multi-color image forming apparatus of the electrophotography system, a technique using a plurality of photosensitive members corresponding to different colors so as to attain speeding-up is known. Such image forming apparatus corresponds to a tandem type which attains multi-color printing by forming toner images of respective colors on respective photosensitive members, and transferring these toner images in turn from the photosensitive member onto a transfer member or a printing material so as to be superposed on each other.

However, an image forming apparatus often suffers a tilt and curvature of a scanning line due to various causes generated by a printing mechanism. In case of the electrophotography system, a tilt and curvature of a scanning line by a deflection scanning unit are caused by nonuniformity of a lens and a displacement of a mounting position of the deflection scanning unit required to expose a photosensitive member, a displacement of a mounting position of the deflection scanning unit on an image forming apparatus main body. More specifically, a position of an actual scanning line by the deflection scanning unit displaces from its ideal position, that is, misregistration occurs. Especially, in case of a multi-color image forming apparatus which uses a plurality of photosensitive members, a tilt and curvature (misregistration) of a scanning line may be different for respective colors. As a result, when toner images are transferred onto a transfer member or printing material to be superposed on each other, relative positions of these images are displaced, thus causing color misregistration, that is, image quality deterioration.

As a coping method against misregistration of a scanning line and color misregistration caused as a result of the misregistration, a technique of Japanese Patent Laid-Open No. 2003-241131 has been proposed. Japanese Patent Laid-Open No. 2003-241131 has proposed the technique for measuring the magnitude of a tilt of a scanning line using an optical sensor in an assembling process of a deflection scanning device in an image forming apparatus main body, and adjusting the tilt of the scanning line by mechanically adjusting the tilt of the deflection scanning device based on the measurement result.

However, since such mechanical adjustment requires a high-precision adjustment device and movable members, cost may increase, and it is difficult to apply this technique to an inexpensive personal image forming apparatus. In a multi-color image forming apparatus, in recent years, in order to attain a cost reduction, a common deflection scanning device is often used to scan the surfaces of a plurality of photosensitive members corresponding to different colors. In this case, it is difficult for the technique described in Japanese Patent Laid-Open No. 2003-241131 to adjust a scanning line for respective colors.

A method of electrically correcting a tilt and curvature of a scanning line in place of such mechanical adjustment (correction) has been proposed. Japanese Patent Laid-Open No. 2004-170755 has proposed a method of measuring the magnitudes of a tilt and curvature of a scanning line using an optical sensor, correcting bitmap image data to cancel them based on the measurement result, and forming an image using the corrected image data. Since this method electrically corrects a scanning line by processing bitmap image data based on the measurement result, the need for mechanical adjustment members and adjustment processes at the time of assembling can be obviated, thus coping with misregistration of the scanning line at lower cost than the method described in Japanese Patent Laid-Open No. 2003-241131. The misregistration correction by Japanese Patent Laid-Open No. 2004-170755 is divided into correction for one pixel unit and that for less than one pixel. In the correction for one pixel unit, positions of respective pixels of image data are offset in a sub-scanning direction by a correction amount for one pixel unit in accordance with correction amounts of a tilt and curvature of a scanning line. In the correction for less than one pixel, a tone value of each pixel of image data and a pixel value of a pixel which neighbors a pixel of interest in the sub-scanning direction are adjusted. With this correction for less than one pixel, an image corrected by the correction for one pixel unit is smoothed.

However, when the correction based on the method of Japanese Patent Laid-Open No. 2004-170755 is applied to image data of a fine line image including fine lines, a line width of the fine line image to be formed may suffer unevenness. Also, when this correction is applied to image data of a fine image including regular patterns with a high spatial frequency, the fine image to be formed may suffer density unevenness.

(Case of Fine Line Image)

FIGS. 22A to 22D show unevenness of a line width which occurs in a fine line image. FIG. 22A shows image data corresponding to an image including a 1-dot fine line along a scanning direction. FIG. 22A shows tone values of respective pixels by numerical values ranging from 0 to 100%. FIG. 22B shows an example of image data obtained when the correction based on the method of Japanese Patent Laid-Open No. 2004-170755 is applied to the image data shown in FIG. 22A. In general, in an electrophotographic image forming apparatus, a tone value less than one pixel is formed by pulse width modulation (PWM). When an image is formed on a printing material using the corrected image data shown in FIG. 22B, an image shown in FIG. 22C is formed.

In FIGS. 22A to 22D, although the width of the line included in the input image is constant, as shown in FIG. 22A, the width of the line included in the image actually formed on the printing material is uneven in the scanning direction, as shown in FIG. 22C. That is, in the image formed based on the corrected image data, the line width is unwantedly changed for respective positions (scanning positions) p0 to p10 in the scanning direction, and becomes uneven in the scanning direction, as shown in FIG. 22D. This is caused by the nonlinear relationship between the width of pulses generated by PWM and a laser light amount in the electrophotographic image forming apparatus. Furthermore, upon forming a dot having a size not more than one dot, such unevenness is caused by the influence of nonlinear factors during processes of exposure-development-transfer-fixing. For these reasons, tone values of respective pixels in the image data, and actually formed dot sizes and densities do not have a linear relationship, thus forming the line with the uneven width.

When a line is solely included in an image, unevenness of the line width is not so conspicuous. However, when a plurality of lines are included in an image to be repeated at short intervals, a change in line width is visualized as a density change at each scanning position in the scanning direction. When this density change is periodically generated in an image, stripe-like density unevenness becomes conspicuous, resulting in image quality deterioration.

Furthermore, in the electrophotography image forming apparatus, it is difficult to stably form dots especially in an area formed by only dots with a small size like scanning positions p3 to p7 in FIG. 22C. For this reason, the relationship between tone values of image data and dot sizes to be actually formed based on these tone values may be irregularly changed according to the use environment of the image forming apparatus or the number of pages to be printed, and the width of a line included in an image may be irregularly changed.

(Case of Fine Image)

FIGS. 23A to 23D show a case in which image data of a fine image shown as an example in FIG. 23A is corrected in the same manner as in the image data of the fine line image shown in FIGS. 22A to 22D. When the image data of the fine image is corrected, densities are changed for respective positions (scanning positions) p0 to p10 in an image formed based on the corrected image data, as shown in FIG. 23D. This is because dot sizes formed based on the corrected image data become uneven according to the scanning positions. As in the case of the fine line image, since such density change periodically occurs in the image, stripe-like density unevenness becomes conspicuous, resulting in image quality deterioration.

To solve such problems, Japanese Patent Laid-Open No. 2007-279429 has proposed a method for eliminating density unevenness which may occur in an image to be formed by adjusting a correction amount of an image position for a unit less than one pixel based on a measurement value obtained by reading a test pattern image using a sensor.

The method of Japanese Patent Laid-Open No. 2007-279429 suffers the following problems. In general, the characteristics of the electrophotography system as a cause of density unevenness change depending on conditions such as a temperature, humidity, degree of degradation of an image forming device, and the like. For this reason, measurements using a sensor have to be made for different conditions, thus increasing a down time. Also, density unevenness which may occur in an image to be formed may change depending on a pattern of the image. For this reason, various pattern images have to be formed, and measurements have to be done for the respective formed pattern images, thus increasing a consumption amount of toner used to form the pattern images in addition to an increase in down time. Furthermore, density unevenness which may occur in an image to be formed appears as very small density changes. In order to measure such very small density changes, a high-precision sensor is required, resulting in an increase in cost.

SUMMARY OF THE INVENTION

The present invention has been made in consideration of the aforementioned problems, and provides a technique for eliminating density unevenness generated in an image to be formed based on image data by modifying correction values corresponding to pixels including a specific pattern of those to be applied to the image data so as to correct misregistration of a scanning line.

According to one aspect of the present invention, there is provided an image processing apparatus comprising: a storage unit configured to store correction values for respective pixels in a main scanning direction of a scanning line, the correction values being required to correct a misregistration of an image to be formed by a light beam, which is caused by deviation of the scanning line of a light beam used to scan a surface of a photosensitive member from an ideal position on the surface of the photosensitive member; a determination unit configured to determine whether or not image data to be corrected using the correction values includes a specific pattern; a modification unit configured to modify, when the determination unit determines that the image data includes the specific pattern, correction values corresponding to pixels including the specific pattern, of the correction values stored in the storage unit using any of a plurality of different predetermined modification values; and a correction unit configured to correct the image data for respective pixels using the correction values stored in the storage unit or the correction values modified by the modification unit.

According to another aspect of the present invention, there is provided an image forming apparatus comprising: a photosensitive member; an image processing apparatus configured to correct input image data; an exposure unit configured to expose a surface of the photosensitive member by scanning a surface of the photosensitive member with a light beam based on the image data corrected by the image processing apparatus; and a developing unit configured to develop an electrostatic latent image formed on the surface of the photosensitive member by exposure of the exposure unit so as to form an image to be transferred to a printing material on the surface of the photosensitive member, wherein the image processing apparatus comprises: a storage unit configured to store correction values for respective pixels in a main scanning direction of a scanning line, the correction values being required to correct a misregistration of an image to be formed by a light beam, which is caused by deviation of the scanning line of a light beam used to scan a surface of the photosensitive member from an ideal position on the surface of the photosensitive member; a determination unit configured to determine whether or not image data to be corrected using the correction values includes a specific pattern; a modification unit configured to modify, when the determination unit determines that the image data includes the specific pattern, correction values corresponding to pixels including the specific pattern, of the correction values stored in the storage unit using any of a plurality of different predetermined modification values; and a correction unit configured to correct the image data for respective pixels using the correction values stored in the storage unit or the correction values modified by the modification unit.

According to still another aspect of the present invention, there is provided a control method of an image processing apparatus, which comprises a storage unit configured to store correction values for respective pixels in a main scanning direction of a scanning line, the correction values being required to correct a misregistration of an image formed by a light beam, which is caused by deviation of the scanning line of a light beam used to scan a surface of a photosensitive member from an ideal position on the surface of the photosensitive member, the method comprising steps of: determining whether or not image data to be corrected using the correction values includes a specific pattern; modifying, when it is determined that the image data includes the specific pattern, correction values corresponding to pixels including the specific pattern, of the correction values stored in the storage unit using any of a plurality of different predetermined modification values; and correcting the image data for respective pixels using the correction values stored in the storage unit or the modified correction values.

According to the present invention, the technique for eliminating density unevenness generated in an image to be formed based on image data by modifying correction values corresponding to pixels including a specific pattern of those to be applied to the image data so as to correct misregistration of a scanning line can be provided.

Further features of the present invention will become apparent from the following description of exemplary embodiments (with reference to the attached drawings).

BRIEF DESCRIPTION OF THE DRAWINGS

FIGS. 7A to 7F are views showing tone conversion processing according to the first embodiment of the present invention;

FIGS. 8A-1 to 8C-3 are views showing an example of a fine image;

FIG. 13 shows an example of dither matrices used in halftone processing according to the first embodiment of the present invention;

FIG. 14 is a view showing an example of the halftone processing result according to the first embodiment of the present invention;

FIGS. 15A to 15E are views showing effects according to the first embodiment of the present invention;

FIGS. 16A to 16E are views showing effects according to the first embodiment of the present invention;

FIGS. 17A to 17D are views showing misregistration correction processing and halftone processing according to the first embodiment of the present invention;

FIG. 18 shows a modulation table according to the second embodiment of the present invention;

FIGS. 20A to 20C are views showing effects according to the second embodiment of the present invention;

FIGS. 22A to 22D are views showing an example of misregistration correction processing; and FIGS. 23A to 23D are views showing an example of misregistration correction processing.

DESCRIPTION OF THE EMBODIMENTS

Figure 1:
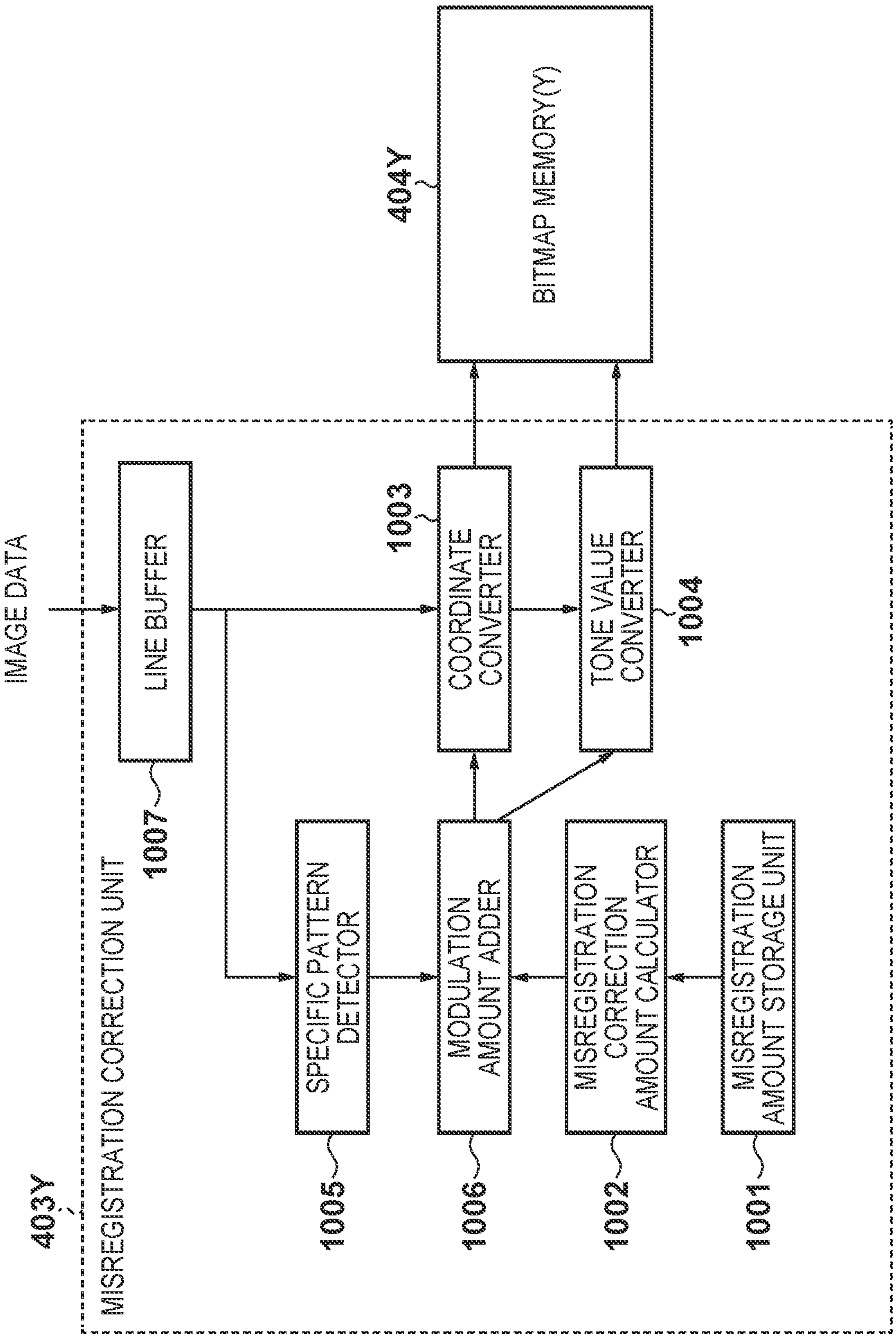
FIG. 1 is a block diagram showing the arrangement of a misregistration correction unit 403Y according to the first embodiment of the present invention.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment will explain a tandem type 4-drum, multi-color image forming apparatus which adopts an intermediate transfer belt based on an electrophotography system as an application example of the present invention.

<Arrangement of Image Forming Apparatus>

The arrangement of an image forming apparatus 10 will be described first with reference to FIG. 2. In this embodiment, the image forming apparatus 10 is a color image forming apparatus which forms an image at a resolution of 600 dpi. The image forming apparatus 10 forms electrostatic latent images respectively on surfaces of photosensitive drums (photosensitive members) 22Y, 22M, 22C, and 22K (to be described as "22Y, 22M, 22C, and 22K" hereinafter for the sake of simplicity; the same applies to other members) in accordance with an exposure control signal generated using pulse width modulation (PWM) by an image processing unit (an image processing unit 400 shown in FIG. 4). Since these electrostatic latent images are developed using toners of respective colors, monochrome (unicolor) toner images are respectively formed on the surfaces of the photosensitive drums 22Y, 22M, 22C, and 22K. Finally, these toner images are transferred onto a surface of a printing material to be superposed on each other, thereby forming a multi-color toner image on the surface of the printing material. An image forming operation executed by the image forming apparatus 10 will be described in more detail below.

The image forming apparatus 10 includes four image forming stations which respectively form unicolor toner images on the plurality of corresponding photosensitive drums 22Y, 22M, 22C, and 22K using toners of different colors. The four image forming stations respectively include the plurality of photosensitive drums 22Y, 22M, 22C, and 22K, injection chargers 23Y, 23M, 23C, and 23K as primary chargers, and scanner units 24Y, 24M, 24C, and 24K. The four image forming stations further respectively include toner cartridges 25Y, 25M, 25C, and 25K and developers 26Y, 26M, 26C, and 26K. The image forming apparatus 10 includes an intermediate transfer member (intermediate transfer belt) 27 onto which toner images formed on the photosensitive drums 22Y, 22M, 22C, and 22K in these image forming stations are transferred.

The photosensitive drums 22Y, 22M, 22C, and 22K are respectively rotated by driving forces of different driving motors (not shown). The injection chargers 23Y, 23M, 23C, and 23K respectively include sleeves 23YS, 23MS, 23CS, and 23KS, which respectively charge the corresponding photosensitive drums 22Y, 22M, 22C, and 22K. The scanner units 24Y, 24M, 24C, and 24K form electrostatic latent images on the corresponding photosensitive drums by exposing the charged surfaces of the photosensitive drums 22Y, 22M, 22C, and 22K with laser beams (light beams). The developers 26Y, 26M, 26C, and 26K respectively include sleeves 26YS, 26MS, 26CS, and 26KS. The developers 26Y, 26M, 26C, and 26K respectively develop the electrostatic latent images on the photosensitive drums 22Y, 22M, 22C, and 22K using toners of different colors supplied from the toner cartridges 25Y, 25M, 25C, and 25K. More specifically, the developers 26Y, 26M, 26C, and 26K respectively visualize the electrostatic latent images on the photosensitive drums 22Y, 22M, 22C, and 22K using toners of Y, M, C, and K colors, thereby forming toner images of the respective colors on the surfaces of the photosensitive drums.

Figure 2:
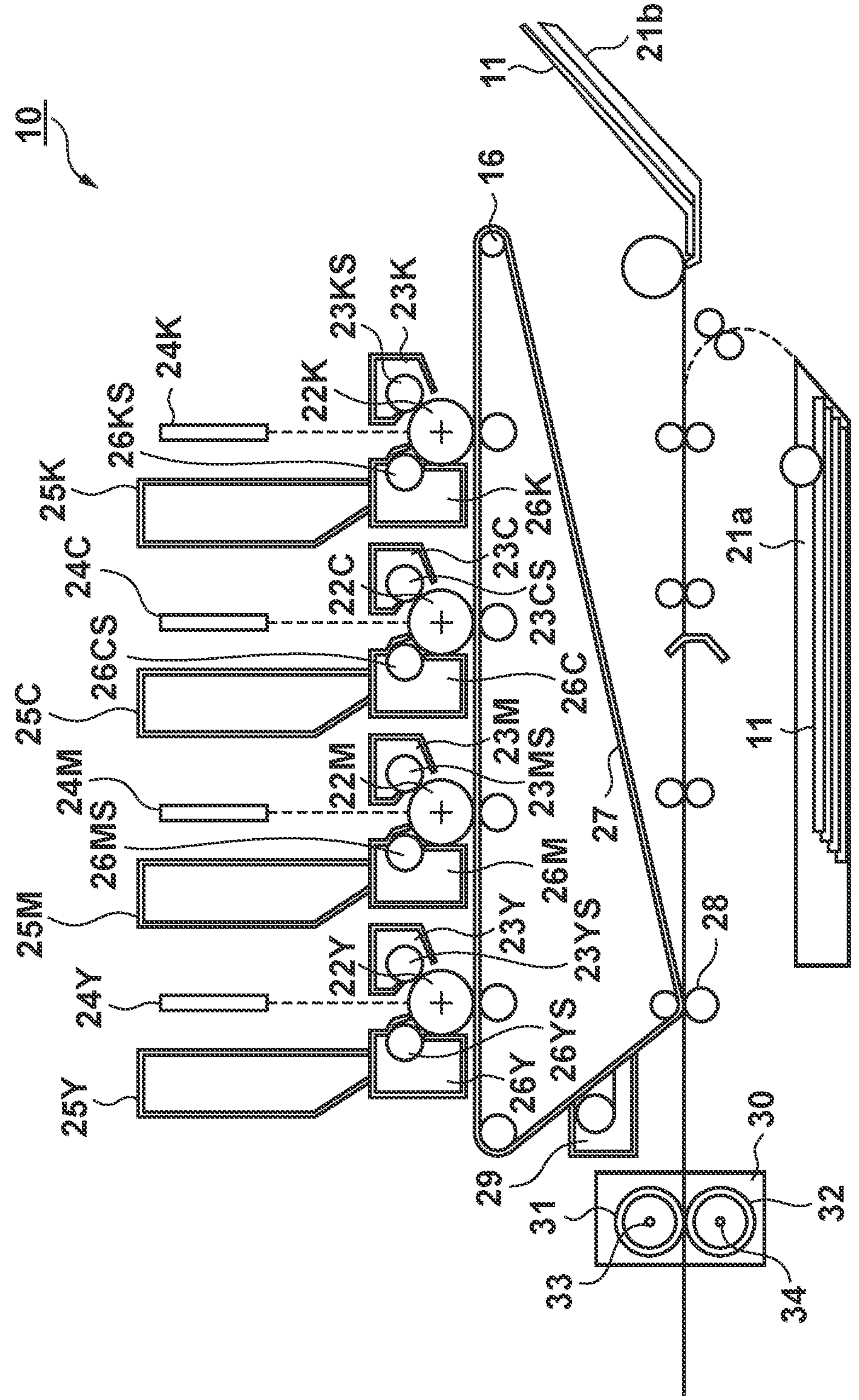
FIG. 2 is a sectional view showing the arrangement of an image forming apparatus 10 according to the first embodiment of the present invention.

The intermediate transfer member 27 is arranged at a position where it is in contact with the photosensitive drums 22Y, 22M, 22C, and 22K, as shown in FIG. 2. At the time of image formation, unicolor toner images from the photosensitive drums 22Y, 22M, 22C, and 22K are transferred (primary transfer) to be superposed in turn onto the intermediate transfer member 27, which is rotated by the driving force of a driving roller 16. In this way, a multi-color toner image is formed on the surface of the intermediate transfer member 27. Note that the driving roller 16 is driven by a driving motor (not shown) for the intermediate transfer member 27.

The multi-color toner image formed on the intermediate transfer member 27 is conveyed to a nip portion between the intermediate transfer member and a transfer roller 28 upon rotation of the intermediate transfer member. In synchronism with a conveyance timing of the toner image to the nip portion, a printing material 11 is fed from a paper feed unit 21*a* or 21*b*, and is conveyed to the nip portion along a convey path. The transfer roller 28 is in contact with the intermediate transfer member 27 via the conveyed printing material 11. While the transfer roller 28 is in contact with the intermediate transfer member 27, the multi-color toner image formed on the intermediate transfer member is transferred onto the printing material 11 (secondary transfer). In this manner, the multi-color toner image is formed on the printing material 11. Upon completion of the secondary transfer from the intermediate transfer member 27 onto the printing material 11, the transfer roller 28 is separated from the intermediate transfer member 27.

The printing material 11 on which the multi-color toner image is transferred is then conveyed to a fixing unit 30 along the convey path. The fixing unit 30 melts the toner image on the printing material 11 conveyed along the convey path, thereby fixing the toner image on the printing material 11. The fixing unit 30 includes a fixing roller 31 used to heat the printing material 11, and a pressure roller 32 used to bring the printing material 11 into pressure-contact with the fixing roller 31. The fixing roller 31 and pressure roller 32 are formed to have a hollow shape, and respectively incorporate heaters 33 and 34. The printing material 11 which holds the multi-color toner image on its surface is applied with heat and pressure while being conveyed by the fixing roller 31 and pressure roller 32 in the fixing unit 30. In this way, the toner image is fixed on the surface of the printing material 11. After the toner image is fixed, the printing material 11 is discharged onto a discharge tray (not shown) by a discharge roller (not shown). With the above processes, the image forming operation on the printing material 11 is complete.

A cleaning unit 29 arranged in the vicinity of the intermediate transfer member 27 includes a cleaner container, and recovers residual toner (waste toner) on the intermediate transfer member 27 after the secondary transfer of the toner image onto the printing material 11. The cleaning unit 29 stores the recovered waste toner in the cleaner container. In this manner, the cleaning unit 29 cleans the surface of the intermediate transfer member 27.

This embodiment will explain the image forming apparatus 10 (FIG. 2) including the intermediate transfer member 27. However, the present invention is applicable to a primary transfer type image forming apparatus, which directly transfers toner images formed on the photosensitive drums 22Y, 22M, 22C, and 22K onto a printing material. In this case, the intermediate transfer member 27 shown in FIG. 2 may be replaced by a conveyor belt. In this embodiment, the different driving motors are used respectively for the photosensitive drums 22Y, 22M, 22C, and 22K. However, a common (single) motor may be used for all the photosensitive drums.

Note that in the following description, a scanning direction of the surfaces of the photosensitive drums 22Y, 22M, 22C, and 22K with laser beams output from the scanner units 24Y, 24M, 24C, and 24K will be referred to as a main scanning direction, and a direction perpendicular to the main scanning direction will be referred to as a sub-scanning direction. The sub-scanning direction agrees with a conveyance direction of the printing material 11 (=a rotation direction of the intermediate transfer member 27).

<Tilt and Curvature of Scanning Line in Image Forming Apparatus>

Tilts and curvatures of scanning lines of laser beams on the surfaces of the photosensitive drums 22Y, 22M, 22C, and 22K, which may occur in the image forming apparatus 10, will be described below with reference to FIG. 3. As described above, displacements of mounting positions of the scanner units 24Y, 24M, 24C, and 24K and photosensitive drums 22Y, 22M, 22C, and 22K with respect to the image forming apparatus 10 may cause tilts and curvatures of scanning lines by laser beams output from the scanner units 24Y, 24M, 24C, and 24K. Also, distortions of characteristics of lenses (not shown) in the scanner units 24Y, 24M, 24C, and 24K may cause such tilts and curvatures of scanning lines. In this manner, since actual scanning lines of the laser beams suffer tilts and curvatures, actual positions of the scanning lines deviate from their ideal positions. In the following description, such deviations of the actual scanning lines formed by the laser beams from their ideal positions will be referred to as “misregistration”.

Figure 3:
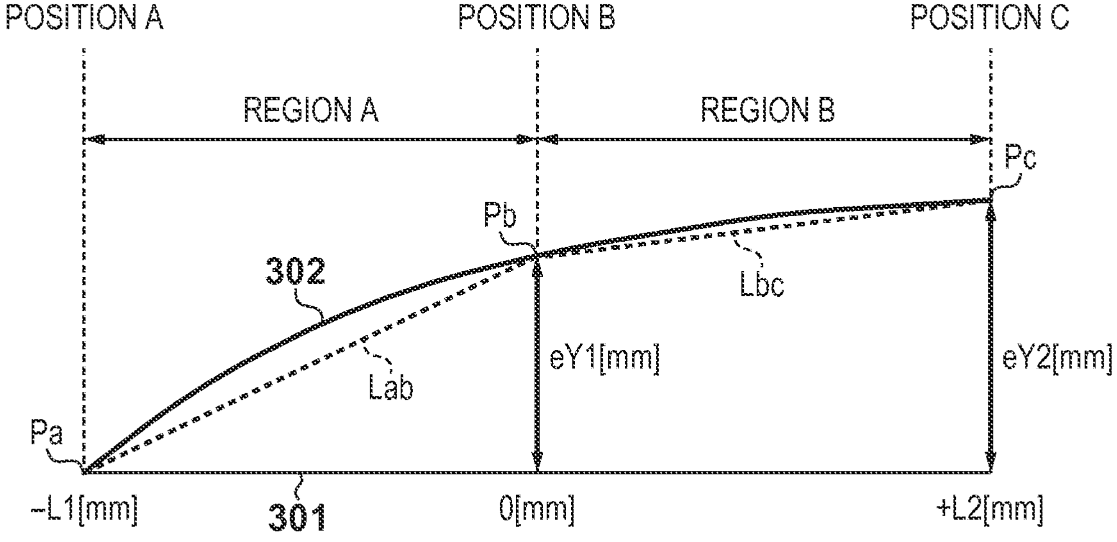
FIG. 3 is a view showing an example of an ideal scanning line and actual scanning line on a photosensitive drum 22Y.

FIG. 3 shows an example of a tilt and curvature (misregistration), which occur in a scanning line when the surface of the photosensitive drum 22Y is scanned with a laser beam. Referring to FIG. 3, a horizontal direction agrees with the main scanning direction, and a vertical direction agrees with the sub-scanning direction. A scanning line 301 along the horizontal direction indicates an ideal linear scanning line which does not suffer any tilt or curvature. A scanning line 302 indicates an actual scanning line which suffers a tilt and curvature due to the aforementioned causes, and misregistration has occurred with respect to the ideal scanning line 301. FIG. 3 shows the scanning line on the photosensitive drum 22Y, but similar scanning lines are also formed on the photosensitive drums 22M, 22C, and 22K. When such tilts and curvatures (misregistration) of the scanning lines have occurred for the plurality of colors, relative positions of respective toner images deviate, that is, “color misregistration” consequently occurs when the toner images of the plurality of colors are transferred onto the intermediate transfer member 27 to be superposed on each other.

In this embodiment with reference to a left end (position A) of the scanning line on the photosensitive drum 22Y, differences between the ideal scanning line 301 and actual scanning line 302 at a center (position B) and right end (position C) are measured as deviation amounts eY1 and eY2 [m] in the sub-scanning direction. Also, deviation amounts eM1, eM2, eC1, eC2, eK1, and eK2 on the photosensitive drums 22M, 22C, and 22K are similarly measured. As shown in FIG. 3, in association with the positions A, B, and C, the position B is used as a reference (0 [mm]), the position A is expressed by −L1 [mm], and the position C is expressed by +L2 [mm]. Also, points Pa, Pb, and Pc express scanning positions of the actual scanning line 302 measured in association with the positions A, B, and C in the sub-scanning direction.

In this embodiment, a region in the main scanning direction on each of the photosensitive drums 22Y, 22M, 22C, and 22K is divided into a plurality of regions with reference to the plurality of points Pa, Pb, and Pc, a region between Pa and Pb is defined as a region A, and that between Pb and Pc is defined as a region B. Then, (tilts) of scanning lines in the regions A and B are respectively approximated by lines Lab and Lbc obtained by applying linear interpolation to curves between Pa and Pb and between Pb and Pc. Based on a deviation amount difference between two points (eY1 for the region A, and eY2−eY1 for the region B), a tilt of a scanning line of the corresponding region can be judged. For example, when a calculated difference assumes a positive value, a scanning line of the corresponding region has an upward-sloping tilt; when it assumes a negative value, the scanning line has a downward-sloping tilt.

<Arrangement and Operation of Image Processing Unit 400>

Figure 4:
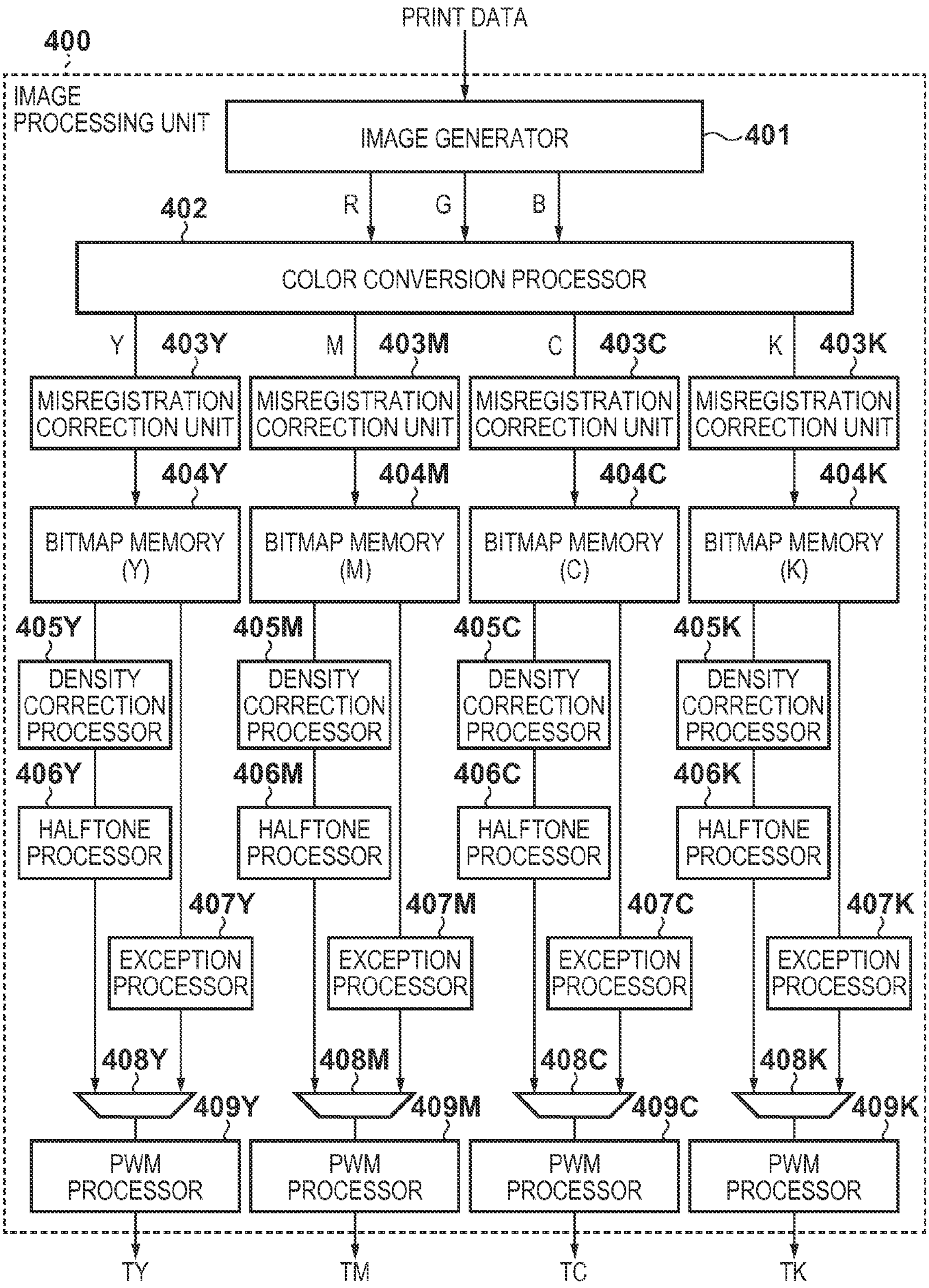
FIG. 4 is a block diagram showing the arrangement of an image processing unit 400 according to the first embodiment of the present invention.

The arrangement and operation of an image processing unit 400 according to this embodiment will be described below with reference to FIG. 4. The image processing unit 400 executes correction processing required to correct a tilt and curvature (misregistration) of a scanning line, and executes PWM based on image data which has undergone the correction processing, thus generating the aforementioned exposure control signal. The generated exposure control signal is used in exposure in the scanner units 24Y, 24M, 24C, and 24K.

Print data (PDL data, bitmap data, etc.) received by the image forming apparatus 10 from a host computer (not shown) or the like is input to the image processing unit 400. The print data input to the image processing unit 400 is input to an image generator 401. The image generator 401 executes rasterize processing for interpreting the contents of the input print data, and converting the print data into bitmap data. The image generator 401 sends raster images generated by the rasterize processing, that is, image signals (RGB signals) of respective color components R, G, and B, to a color conversion processor 402.

The color conversion processor 402 executes color matching processing for converting RGB signals into device RGB signals which match a color gamut of the image forming apparatus 10. Furthermore, the color conversion processor 402 executes color separation processing for converting the device RGB signals into YMCK signals (Y, M, C, and K image data) corresponding to toner colors of the image forming apparatus 10. Note that these color matching processing and color separation processing can be implemented by LOG conversion and calculations such as matrix calculations. Alternatively, a conversion table used to convert RGB signals of some representative points into YMCK signals may be held, and colors between these representative points may be calculated by interpolation, thus implementing the above processes.

Misregistration correction units 403Y, 403M, 403C, and 403K apply coordinate conversion and adjustment of tone values (to be described later) to the Y, M, C, and K image data input from the color conversion processor 402 as correction processing for correcting the aforementioned tilt and curvature (misregistration) of the scanning line. As a result, the misregistration correction units 403Y, 403M, 403C, and 403K prevent transferred toner images from suffering color misregistration when toner images of respective colors are transferred onto the intermediate transfer member 27 and further onto the printing material 11. The misregistration correction units 403Y, 403M, 403C, and 403K store the Y, M, C, and K image data after the correction processing in bitmap memories 404Y, 404M, 404C, and 404K together with modulation bit flags (to be described later).

The bitmap memories 404Y, 404M, 404C, and 404K temporarily store image data corrected by the misregistration correction units 403Y, 403M, 403C, and 403K. Each of the bitmap memories 404Y, 404M, 404C, and 404K can store image data for one page. The image data stored in the bitmap memories 404Y, 404M, 404C, and 404K are read out in synchronism with Y, M, C, and K image generation (image formation or print) timings. The readout Y, M, C, and K image data are input to density correction processors 405Y, 405M, 405C, and 405K or exception processors 407Y, 407M, 407C, and 407K.

The density correction processors 405Y, 405M, 405C, and 405K and halftone processors 406Y, 406M, 406C, and 406K or the exception processors 407Y, 407M, 407C, and 407K respectively apply processing to respective pixels of the image data stored in the bitmap memories 404Y, 404M, 404C, and 404K. Selectors 408Y, 408M, 408C, and 408K select the image data output from the halftone processors 406Y, 406M, 406C, and 406K or exception processors 407Y, 407M, 407C, and 407K for each pixel in accordance with the modulation flag bits stored in the bitmap memories 404Y, 404M, 404C, and 404K. The selectors 408Y, 408M, 408C, and 408K further outputs the selected image data for respective pixels to PWM processors 409Y, 409M, 409C, and 409K.

The PWM processors 409Y, 409M, 409C, and 409K execute PWM processing based on the input image data. More specifically, the PWM processors 409Y, 409M, 409C, and 409K convert the input image data into exposure times TY, TM, TC, and TK of the scanner units 24Y, 24M, 24C, and 24K for each pixels and output the converted exposure times. Signals (exposure control signals) indicating the exposure times TY TM, TC, and TK for respective colors output from the PWM processors 409Y, 409M, 409C, and 409K are respectively input to the scanner units 24Y, 24M, 24C, and 24K. The scanner units 24Y, 24M, 24C, and 24K output laser beams in accordance with the exposure times TY, TM, TC, and TK indicated by the exposure control signals, thereby exposing and scanning the photosensitive drums 22Y, 22M, 22C, and 22K with these laser beams.

Note that in this embodiment, data for each pixel, which is stored in each of the bitmap memories 404Y, 404M, 404C, and 404K, is data of a total of 9 bits, that is, 8-bit image data and a 1-bit modulation flag bit. Each modulation flag bit stored in each of the bitmap memories 404Y, 404M, 404C, and 404K is reset to zero at the start timing of image formation. Also, the density correction processors 405Y, 405M, 405C, and 405K output 8-bit data for respective colors, and the halftone processors 406Y, 406M, 406C, and 406K and exception processors 407Y, 407M, 407C, and 407K output 4-bit data for respective colors.

<Arrangement and Operation of Misregistration Correction Units 403Y, 403M, 403C, and 403K>

The arrangement and operation of the misregistration correction unit 403Y will be described in detail below with reference to FIG. 1. The misregistration correction unit 403Y which executes misregistration correction for image data corresponding to a Y color of Y, M, C, and K toner colors will be described below. Note that the arrangements and operations of the misregistration correction units 403M, 403C, and 403K are the same as those of the misregistration correction unit 403Y, and a description thereof will not be given. The misregistration correction unit 403Y includes a misregistration amount storage unit 1001, misregistration correction amount calculator 1002, coordinate converter 1003, tone value converter 1004, specific pattern detector 1005, modulation amount adder 1006, and line buffer 1007.

(Misregistration Amount Storage Unit 1001)

Figures 5, 6A, 6B:
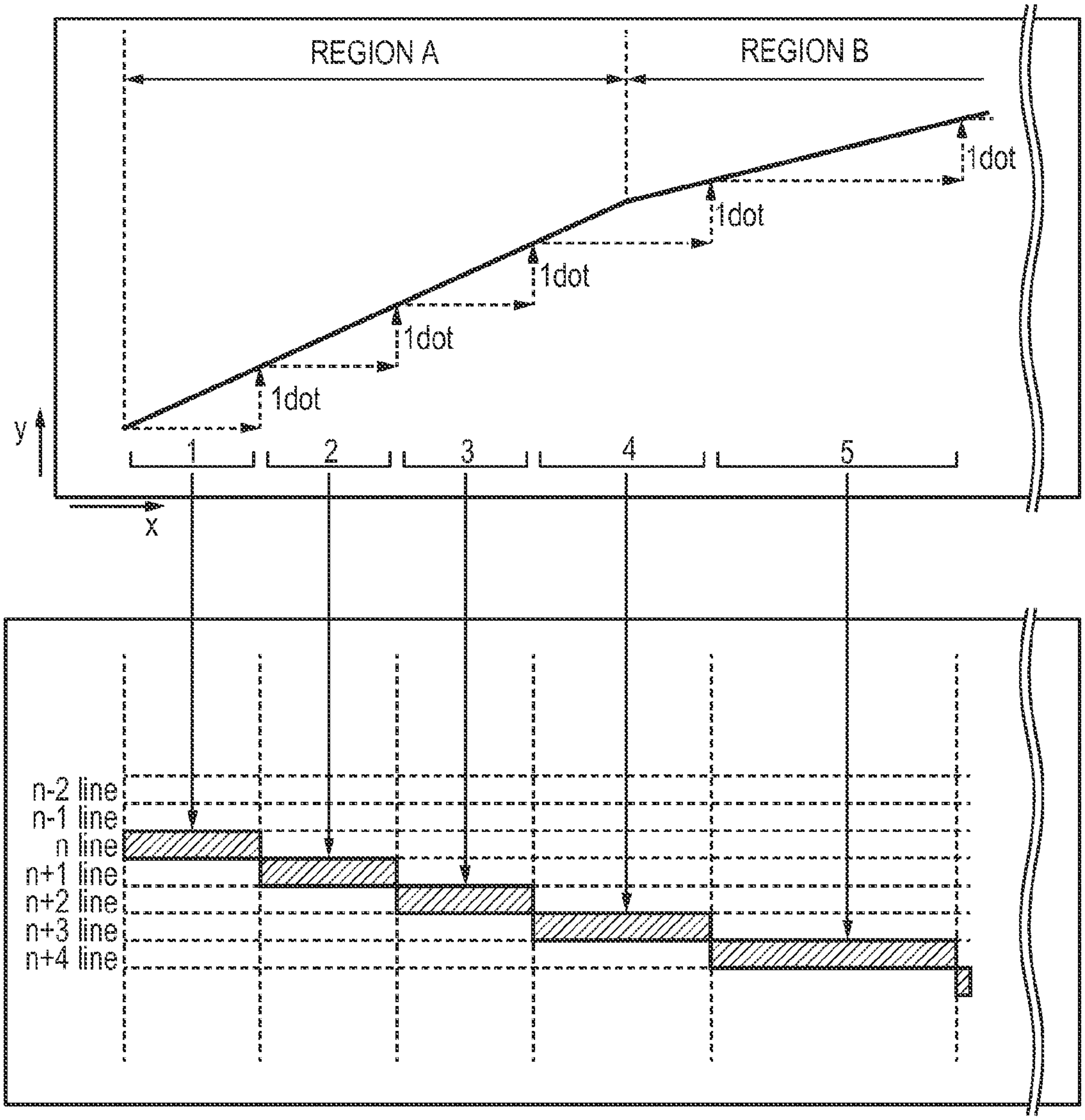
FIG. 5 is a table showing the relationship between main scanning positions and misregistration amounts according to the first embodiment of the present invention.
FIGS. 6A and 6B are views showing coordinate conversion processing according to the first embodiment of the present invention.

The misregistration amount storage unit 1001 stores data indicating positions in the main scanning direction and misregistration amounts corresponding to the points Pa, Pb, and Pc described using FIG. 3. More specifically, the misregistration amount storage unit 1001 stores positions in the main scanning direction (main scanning positions) and misregistration amounts for the points Pa, Pb, and Pc in association with each other, as shown in FIG. 5. In this case, for the points Pa, Pb, and Pc, the main scanning positions –L1, 0, and +L2 [mm] and misregistration amounts 0, eY1, and eY2 [mm] are stored in the misregistration amount storage unit 1001 in association with each other.

Note that the format and the number of data stored in the misregistration amount storage unit 1001 are not limited to those shown in FIG. 5, but they may be decided according to the characteristics of the image forming apparatus 10. The misregistration amounts may be measured using a jig in the manufacturing processes of the image forming apparatus 10 or may be repetitively measured every time print processes of a predetermined number of pages are completed or every time a given time period elapses. In the latter case, a misregistration detection pattern may formed on the intermediate transfer member 27, and misregistration amounts may be detected based on the detection result of the detection pattern using, for example, the optical sensor. Alternatively, a misregistration detection pattern may be formed on the printing material 11, and misregistration amounts may be detected based on the detection result of the detection pattern using, for example, an external scanner. As shown in FIG. 3, deviation amounts of an actual scanning line with reference to an ideal scanning line may be used as misregistration amounts, or a specific color may be used as a reference color, and deviation amounts of scanning lines of other colors with respect to a scanning line of the reference color may be used as misregistration amounts.

(Misregistration Correction Amount Calculator 1002)

The misregistration correction amount calculator 1002 calculates misregistration amounts at respective points in the main scanning direction based on data stored in the misregistration amount storage unit 1001, and inputs the calculation result to the modulation amount adder 1006. In the following description, "dot" or "line" used as a unit of a coordinate and the like indicates a unit of a resolution of the image forming apparatus 10, and an upper left end of an image is used as coordinates of an origin, unless otherwise specified.

Letting x (dots) be data of respective coordinates (coordinate data) in the main scanning direction, and Δy be a misregistration amount in the sub-scanning direction, the misregistration correction amount calculator 1002 calculates Δy as a misregistration correction amount. Note that this Δy corresponds to a correction value for each pixel in the main scanning direction of a scanning line, so as to correct misregistration of an image to be found caused by a deviation of a scanning line of a light beam which scans each of the surfaces of the photosensitive drums 22Y, 22M, 22C, and 22K from its ideal position on the surface. More specifically, the misregistration correction amount calculator 1002 divides a main scanning line of the photosensitive drum 22Y into a plurality of regions (regions A and B shown in FIG. 3), and calculates misregistration correction amounts Δy at a coordinate x for the respective divided regions using:

$$\Delta y = x^*(eY1/L1) \qquad \text{Region A:}$$

$$\Delta y = eY1^*r + (eY2 - eY1)^*x/L2 \qquad \text{Region B:}$$

where r indicates a resolution of image formation, and r=600/25.4 [dots/mm] in this embodiment. L1 and L2 are respectively distances from the point Pa to the point Pb and from the point Pb to the point Pc in the main scanning direction, as shown in FIG. 3. eY1 and eY2 are respectively the misregistration amounts at the points Pb and Pc.

In FIG. 3, a plus (+) direction of a misregistration amount in the sub-scanning direction, which is measured in advance, corresponds to an upstream direction of the sub-scanning direction. For this reason, the plus (+) direction of the misregistration correction amount Δy for each coordinate x corresponds to a downstream direction of the sub-scanning direction so as to cancel the misregistration. The misregistration correction amounts Δy for respective coordinates x, which are calculated by the misregistration correction amount calculator 1002, are output to the modulation amount adder 1006.

Note that in this embodiment, the misregistration correction amount Δy for each coordinate x is calculated by simple linear interpolation like in the above equations, but other interpolation methods may be used. For example, bicubic interpolation, spline interpolation, and the like, which generally require a longer processing time than linear interpolation, but can improve precision, may be used. That is, the interpolation method to be used may be decided in consideration of the processing time and precision required for the image forming apparatus 10.

(Modulation Amount Adder 1006)

The modulation amount adder 1006 modifies the misregistration correction amount Δy by adding any of a plurality of predetermined modulation amounts (modification values) to each misregistration correction amount Δy input from the misregistration correction amount calculator 1002 as needed. The modulation amount adder 1006 executes such processing when the specific pattern detector 1005 determines that image data read out from the line buffer 1007 includes a specific pattern. Note that details of the operations of the specific pattern detector 1005 and modulation amount adder 1006 will be described later.

(Line Buffer 1007)

The line buffer 1007 is a memory which can store image data for several lines, and stores image data from the color conversion processor 402 for several lines. The number of lines of image data which can be stored in the line buffer 1007 can be decided according to a window filter size (to be described later) used in the specific pattern detector 1005.

(Coordinate Converter 1003)

The coordinate converter 1003 converts coordinates (in the sub-scanning direction) of respective pixel data included in the image data input from the line buffer 1007 based on correction amounts Δ obtained from the modulation amount adder 1006. In this manner, image data is corrected based on a value of an integer part of the correction amount Δy (that is, misregistration correction for one pixel) in correspondence with coordinates in the main scanning direction and sub-scanning direction for each pixel data included in the image data. The following description will be given under the assumption that no modulation amount is added to the correction amount Δ by the modulation amount adder 1006 (that is, the correction amount Δy is that obtained by the misregistration correction amount calculator 1002) for the sake of simplicity.

The coordinate conversion processing executed by the coordinate converter 1003 will be described below with reference to FIGS. 6A and 6B. FIG. 6A shows misregistration correction amounts Δy, which are obtained by the misregistration correction amount calculator 1002, and correspond to a scanning line approximated by a line using linear interpolation. Also, FIG. 6B shows write positions of image data corrected (reconstructed) using the misregistration correction amounts Δy on the bitmap memory 404Y.

The coordinate converter 1003 offsets coordinates of image data of the line buffer 1007 in the sub-scanning direction (y-direction) for respective lines in accordance with integer part values of the misregistration correction amounts Δy, as shown in FIG. 6A. For example, when the coordinate converter 1003 reconstructs pixel data, coordinates in the sub-scanning direction of which correspond to an n-th line, as shown in FIG. 6B, it reads out pixel data for one line of the n-th line from the line buffer 1007. Letting x be a coordinate indicating a position in the main scanning direction, the coordinate converter 1003 executes coordinate conversion of pixel data so as to offset pixel data corresponding to the coordinate x for lines corresponding to an integer part of the misregistration correction amount Δy corresponding to the coordinate x. The pixel data after coordinate conversion are written in a line according to the converted coordinate in the bitmap memory 404Y.

In FIGS. 6A and 6B, since 0≤Δy<1 for a region (1), pixel data in the region (1) of the n-th line are written at an n-th line of the bitmap memory 404Y. Since 1≤Δy<2 for a region (2), pixel data in the region (2) of the n-th line are written at a position offset by one line in the sub-scanning direction, that is, at an (n+1)-th line of the bitmap memory 404Y. Likewise, for regions (3) and (4), pixel data in the regions (3) and (4) of the n-th line are respectively written at (n+2)-th and (n+3)-th lines of the bitmap memory 404Y. In this manner, the coordinate converter 1003 executes coordinate conversion processing (reconstruction of output image data) for input image data based on the misregistration correction amounts Δy. Note that a data region corresponding to a line for which processing is complete in the line buffer 1007 is initialized, and is used as a data region for the next line to be processed.

(Tone Value Converter 1004)

Misregistration correction processing executed by the tone value converter 1004 will be described below with reference to FIGS. 7A to 7F. The tone value converter 1004 adjusts tone values of pixels which neighbor a target pixel in the sub-scanning direction (those which are located before and after the target pixel) based on a value of a decimal part of the misregistration correction amount Δy, thereby executing correction processing for misregistration less than one pixel.

FIG. 7A shows an image of a main scanning line having an upward-sloping tilt. FIG. 7B shows a bitmap image of an image including a line having a line width of 2 pixels along the main scanning direction before tone value conversion by the tone value converter 1004. FIG. 7C shows an image of correction corresponding to the image in FIG. 7B so as to cancel misregistration caused by the tilt of the scanning line in FIG. 7A. The tone value converter 1004 adjusts pixel values (tone values) of pixels which neighbor a target pixel in the sub-scanning direction based on the misregistration correction amount Δy so as to implement misregistration correction corresponding to the correction image in FIG. 7C. FIG. 7D shows a tone value conversion table which specifies the relationship between the misregistration correction amounts Δy and correction coefficients α and β required to execute the tone value conversion in the tone value converter 1004.

In FIG. 7D, k is a value obtained by rounding the misregistration correction amount Δy in a negative infinite direction (that is, if Δy assumes a positive value, a value obtained by truncating a value of a decimal part; when it assumes a negative value, a value obtained by rounding up a value of a decimal part). k represents a correction amount for one pixel of misregistration in the sub-scanning direction, and the aforementioned coordinate converter 1003 offsets coordinate data according the values k. α and β are correction amounts less than one pixel, and are correction coefficients required to correct misregistration in the sub-scanning direction. α and β represent distribution ratios for tone values of pixels which neighbor before and after a target pixel in the sub-scanning direction based on a value of a decimal part of the misregistration correction amount Δy. α and β are calculated as follows:

$$\beta = \Delta y - k$$

$$\alpha = 1 - \beta$$

Note that α represents a distribution ratio for a pixel which neighbors the target pixel on the upstream side of the sub-scanning direction. β represents a distribution for a pixel which neighbors the target pixel on the downstream side of the sub-scanning direction.

The aforementioned processes by the coordinate converter 1003 and tone value converter 1004 can be expressed by:

$$H'(x,n+k) = H'(x,n+k) + \alpha * H(x,n)$$

$$H'(x,n+k+1) = H'(x,n+k+1) + \beta * H(x,n)$$

where H(x, n) is a tone value of image data at a coordinate x (dot) in the main scanning direction on the n-th line of the line buffer 1007, and H'(x, n) is a tone value at a coordinate x (dot) on the n-th line of the bitmap memory 404Y.

FIG. 7E shows a bitmap image obtained by the tone value conversion for converting tone values of pixels which neighbor before and after the target pixel in the sub-scanning direction according to the coefficients α and β of the tone value conversion table in FIG. 7D. Note that as can be seen from the image in FIG. 7E, the tone value conversion is executed while each pixel of the image data in FIG. 7B is offset according to a value of an integer part of the misregistration correction amount Δy by the coordinate conversion of the coordinate conversion of the coordinate converter 1003. FIG. 7F shows an exposure image on the photosensitive drum 22Y based on the bitmap image (FIG. 7E) which has undergone the tone value conversion. According to the exposure image in FIG. 7E, the tilt of the aforementioned main scanning line shown in FIG. 7A is canceled, and an image alone the line 7*b* (free from any tilt) is exposed.

The modulation amount adder 1006 notifies the tone value converter 1004 of a modulation flag signal=0 or 1 in association with corresponding coordinates (x, n) together with the misregistration correction amount Δy. When the modulation flag signal=1 and β≈0, the tone value converter 1004 sets modulation flag bits for coordinates (x, n+k) and coordinates (x, n+k+1) of the bitmap memory 404Y to be 1. On the other hand, when the modulation flag signal=1 and β=0, the tone value converter 1004 sets a modulation flag bit for coordinates (x, n+k) of the bitmap memory 404Y to be 1.

(Specific Pattern Detector 1005)

Figures 1, 8A:
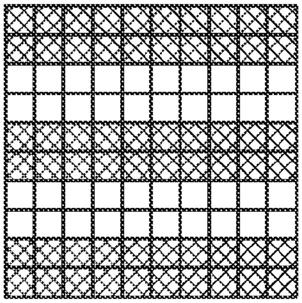
Figures 2, 8A:
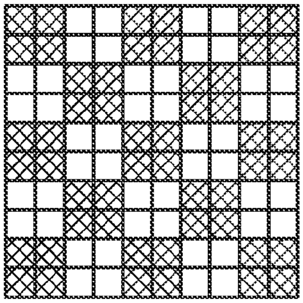
Figures 3, 8A:
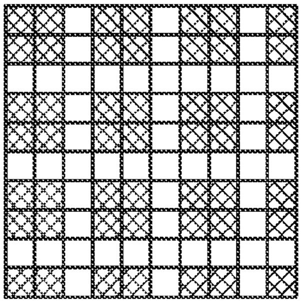
Figures 4, 8A:
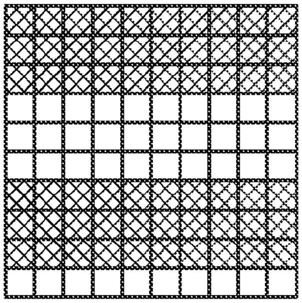
Figures 5, 8A:
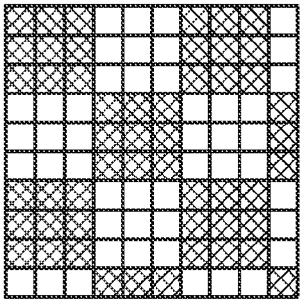
Figures 6, 8A:
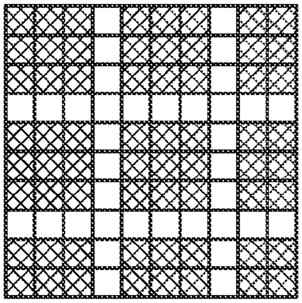
Figures 1, 8B:
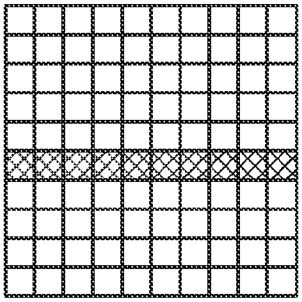
Figures 2, 8B:
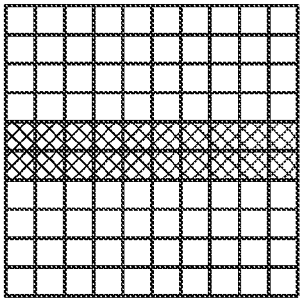
Figures 3, 8B:
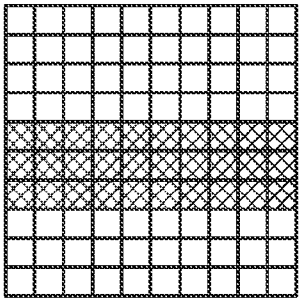
Figures 1, 8C:
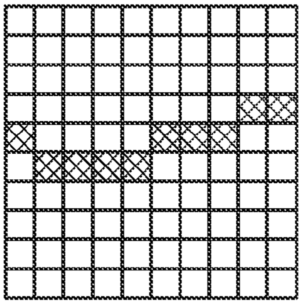
Figures 2, 8C:
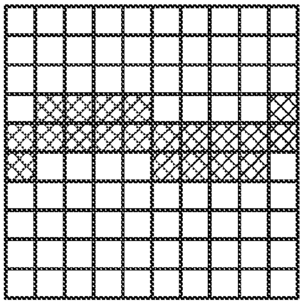
Figures 3, 8C:
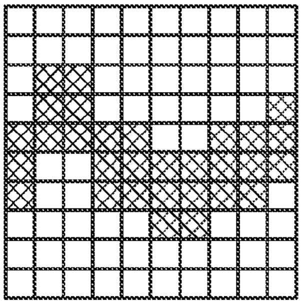

The specific pattern detector 1005 determines whether or not image data in the line buffer 1007 includes a specific pattern. As described above, when the aforementioned misregistration correction processing is applied to fine images including regular patterns like images shown in FIGS. 8A-1 to 8A-6, density unevenness may occur depending on positions in the main scanning direction. On the other hand, when the aforementioned misregistration correction processing is applied to images including isolated fine lines like images shown in FIGS. 8B-1 to 8B-3, high-quality output images can be obtained without causing any density unevenness. Hence, in this embodiment, the specific pattern detector 1005 detects such specific pattern that causes density unevenness from an input image (image data in the line buffer 1007). More specifically, the specific pattern detector 1005 determines whether or not each pixel included in the input image is a part of a fine image including the specific pattern (regular pattern). As a result of determination, the specific pattern detector 1005 sets a fine attribute for a pixel as a part of a fine image to be ON, and sets the fine attribute for other pixels to be OFF.

Figure 9:
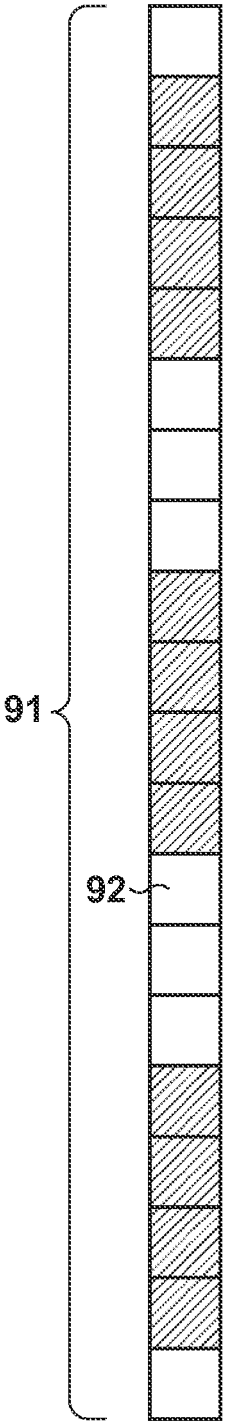
FIG. 9 is a view showing a detection example of a specific pattern according to the first embodiment of the present invention.
Figure 10:
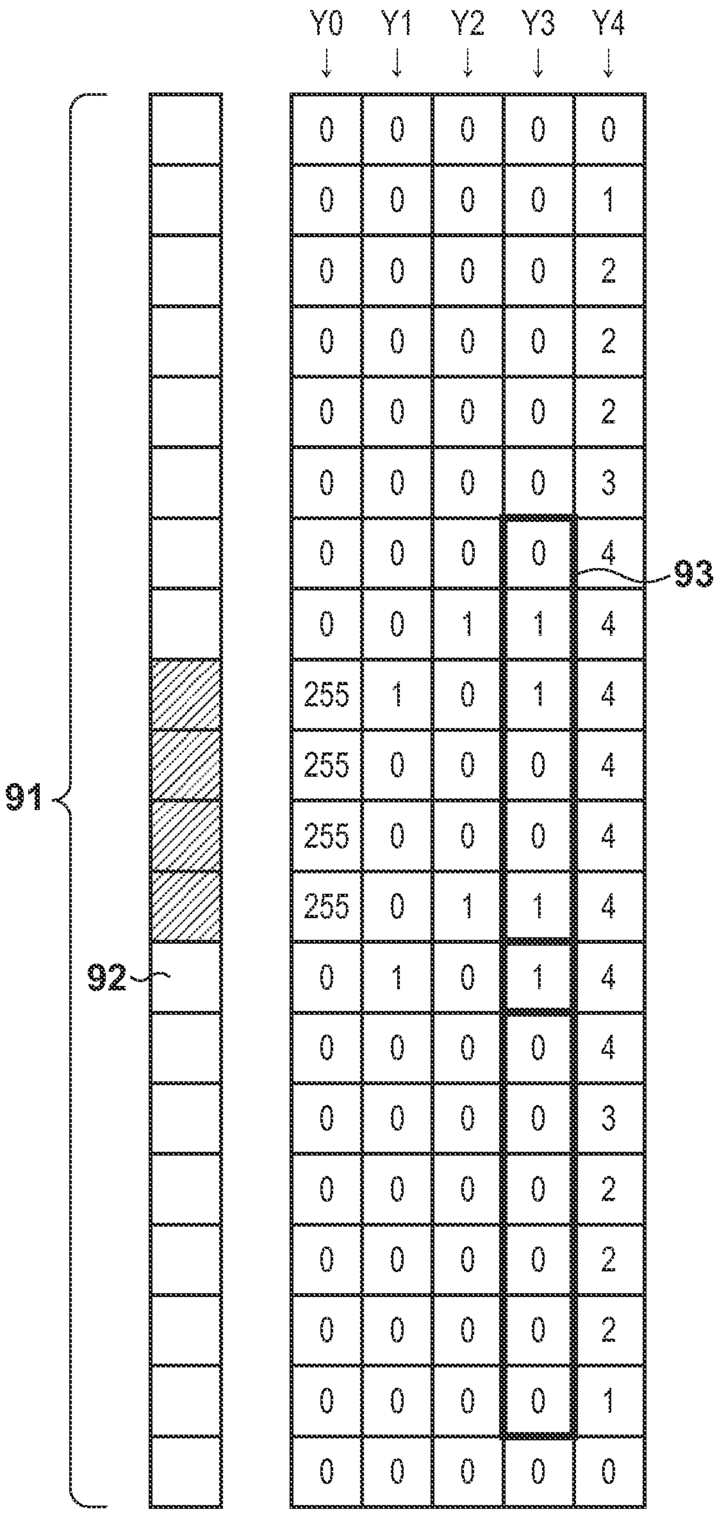
FIG. 10 is a view showing a detection example of a specific pattern according to the first embodiment of the present invention.

The operation of the specific pattern detector 1005 will be described below with reference to FIGS. 9 and 10. A region 91 in FIG. 9 shows an extracted image of 1 pixel×20 pixels (main scanning direction×sub-scanning direction), and values Y0 indicate tone values (0 to 255) of the Y color of respective pixels in the region. The specific pattern detector 1005 sequentially selects respective pixels in the region 91 as a target pixel, and generates values Y1, Y2, Y3, and Y4 from the values Y0. Each value Y1 is obtained by calculating an absolute value of a difference between a tone value of the target pixel and that of an upward neighboring pixel, and binarizing the absolute value. This binarization is attained by, for example, setting the value Y1 to be 1 if the absolute value of the difference is not less than 128, and setting the value Y1 to be 0 if the difference is less than 128. Each value Y2 is obtained by calculating an absolute value of a difference between the tone value of the target pixel and that of a downward neighboring pixel, and binarizing the absolute value. This binarization can be attained in the same manner as the values Y1. Each value Y3 is a logical sum (OR) between the values Y1 and Y2. Each value Y4 is the number of pixels having the values Y3=1 in a window filter 93 which includes the target pixel and the predetermined numbers of pixels above and below the target pixels. In FIG. 9, the predetermined number of pixels is 6, and the window filter 93 including 1 pixel×13 pixels (main scanning direction×sub-scanning direction) is used.

The specific pattern detector 1005 calculates the values Y4 for respective pixels, as described above, and determines based on the values Y4 whether or not a specific pattern is included. In this embodiment, if the value Y4 of the target pixel is not less than 5 (Y4≥5), the specific pattern detector 1005 determines that the target pixel is a part of a fine image, and notifies the modulation amount adder 1006 of a fine attribute=ON of the target pixel. On the other hand, if the value Y4 of the target pixel is less than 5 (Y4<5), the specific pattern detector 1005 determines that the target pixel is not a part of a fine image, and notifies the modulation amount adder 1006 of a fine attribute=OFF of the target pixel.

For example, as for a target pixel 92 in FIG. 9, since a tone value is 0, a tone value of an upward neighboring pixel is 255, and that of a downward neighboring pixel is 0, Y1=1, Y2=0, and Y3=1. Also, since the window filter 93 includes seven pixels having the values Y3=1, Y4=7. Therefore, since Y4≥5 at the target pixel 92, the specific pattern detector 1005 determines that the target pixel 92 is a part of a fine image, and notifies the modulation amount adder 1006 of a fine attribute=ON of the target pixel 92.

In FIG. 9, a threshold required to determine based on the value Y4 whether or not the target pixel is a part of a fine image is set to be 5. This is because Y4≥5 normally holds for a pixel which forms a fine image which is arranged at short intervals or that which forms a (fine) dot pattern having a high spatial frequency, as shown in FIG. 9. On the other hand, as shown in FIG. 10, Y4≤4 normally holds for either of a pixel which forms an isolated fine line or that which forms a (coarse) dot pattern having a low spatial frequency. Using such threshold in determination based on the value Y4, an image including an isolated thin line or coarse dot pattern and a fine image can be easily distinguished from each other. However, as the threshold used in the binarization for the values Y2 and Y3, a value other than 128 may be used. Also, the threshold used in determination based on the value Y4 may be set to match required image quality, and is not limited to 5 alone.

(Modulation Amount Adder 1006)

Figures 11A, 11B:
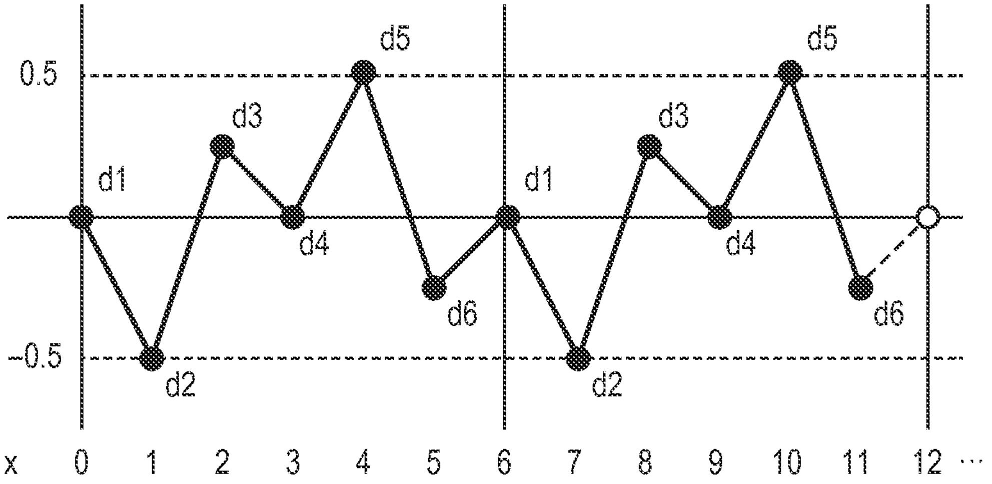
FIGS. 11A and 11B show a modulation amount table according to the first embodiment of the present invention.

The modulation amount adder 1006 holds a modulation amount table shown in FIG. 11A. The modulation amount table includes data d1 to d6, which respectively store any of addresses 0 to 5 and corresponding modulation amounts (dots). The modulation amount adder 1006 decides based on the fine attribute (ON or OFF) notified from the specific pattern detector 1005 whether or not a modulation amount included in the modulation amount table is to be added to the misregistration correction amount Δy for the target pixel. If the fine attribute is OFF, the modulation amount adder 1006 outputs the misregistration correction amount Δy of a coordinate corresponding to the target pixel, which amount is input from the misregistration correction amount calculator 1002, intact to the coordinate converter 1003 without adding any modulation amount. On the other hand, if the fine attribute is ON, the modulation amount adder 1006 adds a modulation amount to the misregistration correction amount Δy of a coordinate corresponding to the target pixel, which amount is input from the misregistration correction amount calculator 1002, and outputs the obtained value to the coordinate converter 1003. That is, the modulation amount adder 1006 modifies the misregistration correction amount Δy using any of a plurality of different predetermined modulation amounts (modification values), and outputs the modified (modulated) amount Δy to the coordinate converter 1003.

More specifically, letting x (dots) be a coordinate in the main scanning direction, the modulation amount adder 1006 calculates mod(x, 6) by a remainder calculation using x and 6. In this case, mod(x, 6) represents a remainder obtained when x is divided by 6. Note that “6” corresponds to the number of sets of addresses and corresponding modulation amounts stored in the modulation amount table. Next, the modulation amount adder 1006 refers to data including an address which matches mod(x, 6) from the modulation amount table, and adds a modulation amount corresponding to that address to a misregistration correction amount Δy of the coordinate x corresponding to the target pixel. For example, when a coordinate x=100, mod(100, 6)=4. In this case, the modulation amount adder 1006 refers to the data d5, and adds a modulation amount=0.5 (dots) to a misregistration correction amount Δy.

FIG. 11B shows modulation amounts respectively corresponding to coordinates x to have the coordinates x (dots) in the main scanning direction as the abscissa. As can be seen from FIG. 11B, those included in the data d1 to d6 stored in the modulation amount table are repetitively applied to the misregistration correction amounts Δy corresponding to the coordinates x in 6-dot cycles in the main scanning direction. If the fine attribute of the coordinate x is ON, the modulation amount adder 1006 notifies the tone value converter 1004 of a modulation flag signal=1; if it is OFF, the modulation amount adder 1006 notifies the tone value converter 1004 of a modulation flag signal=0. The tone value converter 1004 executes the aforementioned processing according to the notified modulation flag signal. Thus, as for a pixel which is to undergo coordinate conversion while a modulation amount is added to the amount Δy, a modulation flag bit of a coordinate after the coordinate conversion is 1.

Note that in this embodiment, the coordinate converter 1003 functions as a first correction unit which corrects a misregistration of an image by a correction amount for a one-pixel unit by offsetting a corresponding pixel in image data for the one-pixel unit in the sub-scanning direction of a scanning line in accordance with the misregistration correction amount Δy (correction value). Also, the tone value converter 1004 functions as a second correction unit which corrects a misregistration of an image by a correction amount less than one pixel by respectively adjusting a pixel value of a corresponding pixel in image data and those of pixels which neighbor the corresponding pixel in the sub-scanning direction.

<Correction Processing in Misregistration Correction Units 403Y, 403M, 403C, and 403K>

Figure 12:
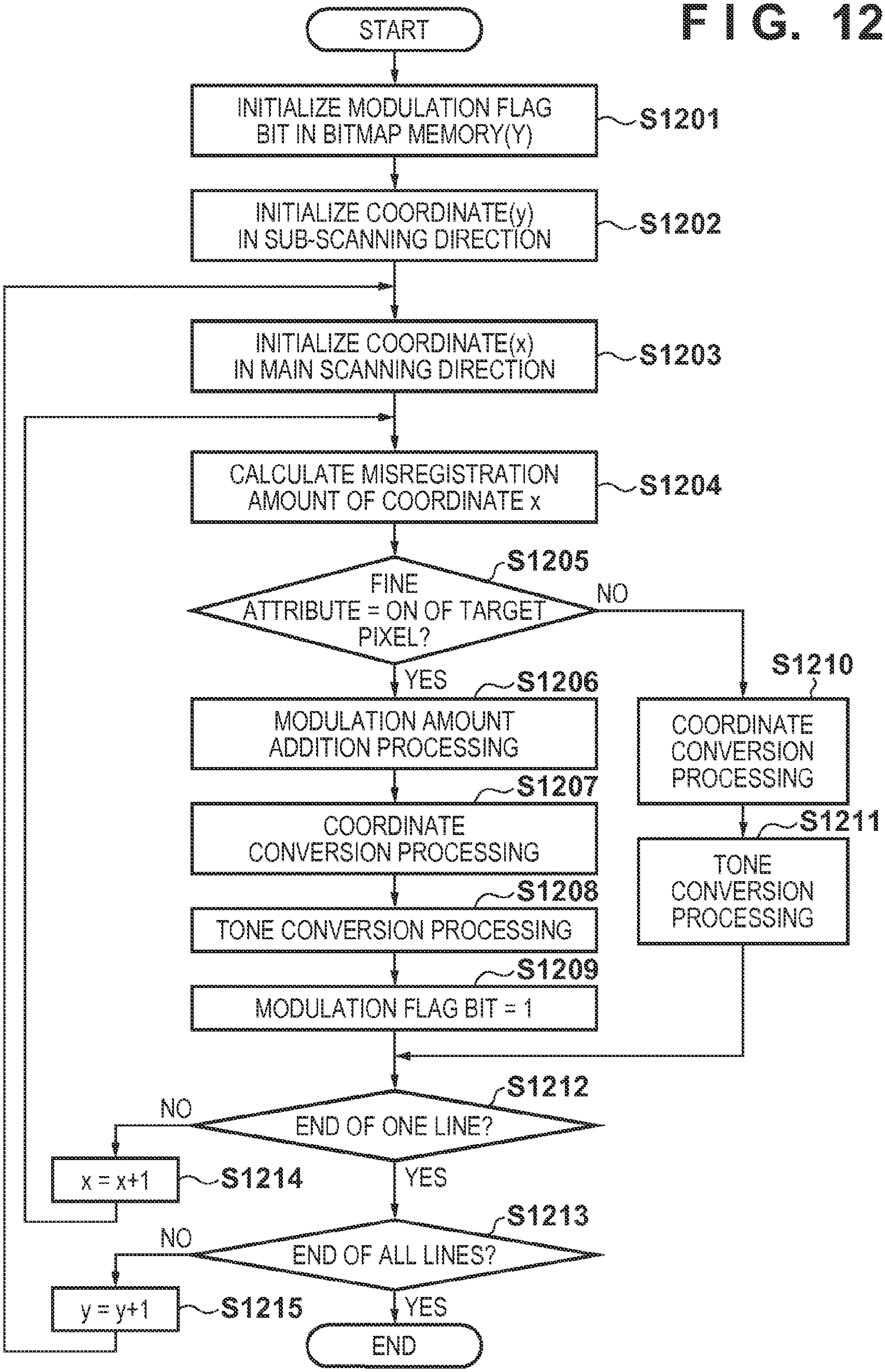
FIG. 12 is a flowchart showing the sequence of misregistration correction processing according to the first embodiment of the present invention.

A series of sequences of the misregistration correction processing executed by the misregistration correction units 403Y, 403M, 403C, and 403K will be described below with reference to FIG. 12. Note that since the misregistration correction units 403Y, 403M, 403C, and 403K execute the misregistration correction processing using the same sequences, the processing of the misregistration correction unit 403Y will be described below.

When the misregistration correction unit 403Y starts the misregistration correction processing, it initializes modulation flag bits included in the bitmap memory 404Y to 0 in step S1201. In this case, let x and y be coordinates in the main scanning direction and sub-scanning direction, which indicate a position of a pixel to be processed (target pixel). Next, the misregistration correction unit 403Y initializes a coordinate y in the sub-scanning direction, which indicates the target pixel, in step S1202, and also initializes a coordinate x in the main scanning direction, which indicates the target pixel, in step S1203. Thus, the misregistration correction unit 403Y starts processing for one line (main scanning line).

Next, in step S1204, the misregistration correction amount calculator 1002 calculates a misregistration correction amount Δy corresponding to the coordinate x of the target pixel. Furthermore, in step S1205, the specific pattern detector 1005 calculates the value Y4 of the target pixel, sets a fine attribute for the target pixel to be ON or OFF based on the aforementioned determination result based on the value Y4, and notifies the modulation amount adder 1006 of that attribute. In step S1205, the modulation amount adder 1006 determines the fine attribute (ON or OFF) notified from the specific pattern detector 1005, and if the fine attribute=ON, the process advances to step S1206; otherwise, the process advances to step S1210. In this manner, the specific pattern detector 1005 determines whether or not image data to be corrected using the misregistration correction amount Δy (correction value) includes a specific pattern.

(When Fine Attribute=ON)

For the target pixel, the modulation amount adder 1006 executes the addition processing of a modulation amount to the misregistration correction amount in step S1206, the coordinate converter 1003 executes the coordinate conversion processing in step S1207, and the tone value converter 1004 executes the tone conversion processing in step S1208, as described above. The misregistration correction unit 403Y stores image data (pixel value) of the target pixel after these processes in the bitmap memory 404Y. After that, the misregistration correction unit 403Y sets a modulation flag bit for the target pixel to be 1 in step S1209 to complete the processing for the target pixel, and the process then advances to step S1212.

(When Fine Attribute=OFF)

For the target pixel, without executing the addition processing of a modulation amount to the misregistration correction amount by the modulation amount adder 1006, the coordinate converter 1003 executes the coordinate conversion processing in step S1210, and the tone value converter 1004 executes tone conversion processing in step S1211, as described above. The misregistration correction unit 403Y stores image data (pixel value) of the target pixel after these processes in the bitmap memory 404Y. After that, the misregistration correction unit 403Y completes the processing for the target pixel while a modulation flag bit for the target pixel is kept set to be 0, and the process advances to step S1212.

The misregistration correction unit 403Y determines in step S1212 whether or not the processes of steps S1204 to S1211 are complete for all pixels included in one line. If the processes are complete, the process advances to step S1213; otherwise, the process advances to step S1214. In step S1214, the misregistration correction unit 403Y increments the coordinate x indicating the position of the target pixel in the main scanning direction by 1 to select a neighboring pixel as the target pixel, and executes the processes of step S1204 and subsequent steps again. On the other hand, if the processes for all the pixels included in the processing for one line are complete, the misregistration correction unit 403Y advances the process to step S1213.

The misregistration correction unit 403Y determines in step S1213 whether or not the processes of steps S1203 to S1212 are complete for all lines included in the image to be processed. If the processes are not complete yet for all the lines, the misregistration correction unit 403Y advances the process to step S1215 to increment the coordinate y indicating the position of the target pixel in the sub-scanning direction by 1. In this manner, the misregistration correction unit 403Y executes the processes of step S1203 and subsequent steps for the next line again. On the other hand, if the processes are complete for all the lines, the misregistration correction unit 403Y ends the series of misregistration correction processes.

<Other Processes in Image Processing Unit 400>

Image data which have undergone the misregistration correction processes by the misregistration correction units 403Y, 403M, 403C, and 403K are stored in the bitmap memories 404Y, 404M, 404C, and 404K. After the misregistration correction processes, the density correction processors 405Y, 405M, 405C, and 405K, halftone processors 406Y, 406M, 406C, and 406K, and exception processors 407Y, 407M, 407C, and 407K execute processes to be described below for the image data stored in the bitmap memories 404Y, 404M, 404C, and 404K.

(Density Correction Processors 405Y, 405M, 405C, and 405K)

The density correction processors 405Y, 405M, 405C, and 405K hold tone (density) correction tables in which the numbers of input and output bits are respectively 8 bits. The density correction processors 405Y, 405M, 405C, and 405K correct input 8-bit tone values for the target pixel using the correction tables. This correction is executed to attain a given relationship (for example, a proportional relationship) between different tones (densities) when pixels are formed on the printing material 11.

Each of the density correction processors 405Y, 405M, 405C, and 405K may hold a plurality of correction tables in correspondence with environmental conditions such as a temperature and humidity of a location of the image forming apparatus 10 or print conditions such as the number of printed pages. In this case, the density correction processors 405Y, 405M, 405C, and 405K may select appropriate correction tables in accordance with the environmental conditions or print conditions. Alternatively, the density correction processors 405Y, 405M, 405C, and 405K may generate appropriate correction tables based on measurement results obtained by a sensor included in the image forming apparatus 10 or an external image scanner. In this manner, the density correction processors 405Y, 405M, 405C, and 405K can use appropriate correction tables in accordance with the characteristics and the like of the image forming apparatus 10.

(Halftone Processors 406Y, 406M, 406C, and 406K)

The halftone processors 406Y, 406M, 406C, and 406K apply halftone processing based on an ordered dither method to image data (tone values) after the processing of the density correction processors 405Y, 405M, 405C, and 405K. With this processing, the halftone processors 406Y, 406M, 406C, and 406K convert 8-bit data (tone values) of respective pixels, which are input from the density correction processors 405Y, 405M, 405C, and 405K, into 4-bit data (tone values), and output these data to the selectors 408Y, 408M, 408C, and 408K. FIG. 13 shows an example of dither matrices used by the halftone processor 406Y. Matrices 1301 to 1315 correspond to 15 threshold tables table1 to table15. Note that FIG. 13 does not show matrices 1303 to 1314 (table3 to table14).

For example, the halftone processor 406Y calculates, in association with a tone value of a pixel at coordinates (x, y), which value is input from the density correction processor 405Y corresponding to the Y color:

$$x' = \mathrm{mod}(x, 4)$$

$$y' = \mathrm{mod}(y, 4)$$

Furthermore, the halftone processor 406Y compares a threshold located in an x' column and y' row in the threshold tables table1 to table15 with an input 8-bit tone value, and outputs a tone value ranging from 0 to 15 according to the comparison result. The halftone processor 406Y executes the comparison processing according to:

when input tone value<threshold of table1, output value=0;

when threshold of table15≤input tone value, output value=15; and when threshold of table(n)≤input tone value<threshold of table(n+1), output value=n The halftone processors 406M, 406C, and 406K also hold dither matrices corresponding to respective colors, and execute the same processing as in the halftone processor 406Y. FIG. 14 shows an example of an image after the halftone processing by the halftone processor 406Y. In FIG. 14, halftone dots are formed in 4-dot cycles in the main scanning direction and sub-scanning direction.

(Exception Processors 407Y, 407M, 407C, and 407K)

The exception processors 407Y, 407M, 407C, and 407K convert (quantize) 8-bit image data (tone values) corresponding to respective colors, which are input from the misregistration correction units 403Y, 403M, 403C, and 403K, into 4-bit image data (tone values). For example, each of the exception processors 407Y, 407M, 407C, and 407K uses 15 thresholds at equal intervals (for example, 9, 26, 43, . . . , 247) to convert an input tone value from an 8-bit value to a 4-bit value based on the comparison result with each threshold.

(Selectors 408Y, 408M, 408C, and 408K)

The selectors 408Y, 408M, 408C, and 408K respectively select outputs from the halftone processors 406Y, 406M, 406C, and 406K or exception processors 407Y, 407M, 407C, and 407K with reference to modulation flag bits which are stored in the bitmap memories 404Y, 404M, 404C, and 404K, and correspond to respective coordinates. When a modulation flag bit=0, the selectors 408Y, 408M, 408C, and 408K select the outputs from the halftone processors 406Y, 406M, 406C, and 406K, and output the selected outputs to the PWM processors 409Y, 409M, 409C, and 409K. On the other hand, when a modulation flag bit=1, the selectors 408Y, 408M, 408C, and 408K select outputs from the exception processors 407Y, 407M, 407C, and 407K, and output the selected outputs to the PWM processors 409Y, 409M, 409C, and 409K.

In this embodiment, with the aforementioned processing, as for pixels which are to undergo misregistration correction processing after modulation amounts are added to corresponding misregistration correction amounts Δy, the exception processing by the exception processors 407Y, 407M, 407C, and 407K is applied to image data after correction. On the other hand, as for other pixels, the density correction by the density correction processors 405Y, 405M, 405C, and 405K and the halftone processing by the halftone processors 406Y, 406M, 406C, and 406K are applied to image data after correction.

<Effect of Modulation Amount Addition Processing>

First to third examples will be described below in association with effects of the modulation amount addition processing by the modulation amount adder 1006 in this embodiment.

First Example

A case will be described first wherein misregistration correction is applied to image data of an input image including a thin line having a 2-dot width along the main scanning direction, as shown in FIG. 15A. In FIGS. 15A to 15E, respective pixel values (tone values) of the image data are expressed by numerical values ranging from 0 to 100(%). FIGS. 15B and 15C show results of the misregistration correction processing for partial regions of the image data shown in FIG. 15A. More specifically, FIGS. 15B and 15C respectively show the results of the misregistration correction processing without adding modulation amounts according to this embodiment to Δy for a region in which misregistration correction amounts Δy are near 0 (dot) and for that in which misregistration correction amounts Δy are near 0.5 (dots). Note that the misregistration correction processing includes the aforementioned coordinate conversion processing and tone conversion processing.

In the image data shown in FIGS. 15B and 15C, although line widths on the image data appear to be equal to each other, line widths when they are visualized on printing material 11 are not equal to each other due to nonlinearity unique to image formation of the electrophotography system. More specifically, in the region shown in FIG. 15B, since pixels based on tone values near 0% are hardly visualized, a line which is mainly based on tone values near 100% and has a 2-dot width along the main scanning direction is visualized on the printing material 11. On the other hand, in the region shown in FIG. 15C, as a result of visualization of pixels based on tone values near 50% and those of 100%, a line having a 3-dot width along the main scanning direction is visualized. As a result, when the misregistration correction processing is applied to image data of an image which repetitively includes lines in the sub-scanning direction like the image shown in FIG. 8A-1, pixels in the region (having larger Δy) shown in FIG. 15C have higher densities than those in the region (having smaller Δy) shown in FIG. 15B. That is, in an image formed on the printing material 11, since densities are changed for respective regions in the main scanning direction, density unevenness occurs in the image to be formed, resulting in image quality deterioration.

By contrast, FIGS. 15D and 15E show results of the misregistration correction processing when the modulation amount addition processing according to this embodiment is applied to the misregistration correction amounts Δy. FIGS. 15D and 15E respectively show results of the misregistration correction processing by adding the modulation amounts according to this embodiment to Δy for a region in which amounts Δy are near 0 (dot) and that in which amounts Δy are near 0.5 (dots). In both FIGS. 15D and 15E, since the modulation amounts are added to Δy, the values of Δy are largely changed for respective positions in the main scanning direction. This is caused by changing the modulation amount to be applied to Δy at a high frequency for each position in the main scanning direction, as shown in FIG. 11B. As a result, tone values of pixels in the regions shown in FIGS. 15D and 15E are distributed between 0 to 100%. When an image is formed on the printing material 11 based on this image data, portions having different line widths are locally mixed in the respective regions on a line included in the image to be formed.

As a result, in both the regions of FIGS. 15D and 15E, since the densities of the image to be formed are averaged and uniformed, density unevenness of the image to be formed can be greatly reduced. In this embodiment, since the modulation amounts are set in advance so that a sum total becomes zero within one cycle of the data d1 to d6, as shown in FIGS. 11A and 11B, a tilt and curvature of a scanning line are averagely and normally corrected within the one cycle. Furthermore, in this embodiment, the modulation amounts are as very small as ±0.5 dots at a maximum, and a repetition cycle of the modulation amounts is 6 (dots)=0.254 mm. Therefore, since the modulation amounts are repetitively increased/decreased in short cycles which are sufficiently insensible to the visual sensitivity, the influence of fluctuations of a line due to application of modulation (modification) becomes a level which cannot be visually recognized.

Second Example

Next, a case will be described below wherein the misregistration correction is applied to image data of a fine image in which dots are arranged checkerwise, as shown in FIG. 16A. FIGS. 16B and 16C show results of the misregistration correction processing for partial regions of the image data shown in FIG. 16A as in FIGS. 15A to 15E. More specifically, FIGS. 16B and 16C respectively show the results of the misregistration correction processing without adding modulation amounts according to this embodiment to Δy for a region in which misregistration correction amounts Δy are near 0 (dot) and for that in which misregistration correction amounts Δy are near 0.5 (dots). Note that the misregistration correction processing includes the aforementioned coordinate conversion processing and tone conversion processing.

In the image data shown in FIGS. 16B and 16C, although dot sizes on the image data appear to be equal to each other, dot sizes when they are visualized on printing material 11 are not equal to each other due to nonlinearity unique to image formation of the electrophotography system. More specifically, in the region shown in FIG. 16B, since pixels based on tone values near 0% are hardly visualized, dots which are mainly based on tone values near 100% and have sizes close to one dot are visualized on the printing material 11. On the other hand, in the region shown in FIG. 16C, as a result of visualization of pixels based on tone values near 50% and those of 100%, dots having sizes close to 2 dots are visualized. As a result, pixels in the region (having larger Δy) shown in FIG. 16C have higher densities than those in the region (having smaller Δy) shown in FIG. 16B. That is, in an image formed on the printing material 11, since respective regions have different densities, density unevenness occurs in the image to be formed, resulting in image quality deterioration.

By contrast, FIGS. 16D and 16E show results of the misregistration correction processing when the modulation amount addition processing according to this embodiment is applied to the misregistration correction amounts Δy. FIGS. 16D and 16E respectively show results of the misregistration correction processing by adding the modulation amounts according to this embodiment to Δy for a region in which amounts Δy are near 0 (dot) and that in which amounts Δy are near 0.5 (dots). In both FIGS. 16D and 16E, since the modulation amounts are added to Δy, tone values of pixels in the regions are distributed between 0 to 100% as in FIGS. 15A to 15E. When an image is formed on the printing material 11 based on this image data, dots having different sizes are locally mixed in the image to be formed.

As a result, in both the regions of FIGS. 16D and 16E, since the densities of the image to be formed are averaged and uniformed, density unevenness of the image to be formed can be greatly reduced. Also, according to the modulation amount table (FIGS. 11A and 11B) according to this embodiment, when a cycle of a specific image pattern in the main scanning direction is that of two or four pixels, different modulation amounts are added for respective dots of the image irrespective of the relationship between a phase of the modulation amounts d1 to d6 and that of the image. Therefore, irrespective of a phase of a specific image pattern included in an image, density unevenness of an image to be formed can be reduced. Note that in FIGS. 15A to 15E and FIGS. 16A to 16E, tone values of respective pixels in image data are expressed by 0 to 100(%). However, in practice, tone values are quantized to 4-bit values by the exception processors 407Y, 407M, 407C, and 407K when they are output. The reason why the exception processing is applied to pixels which have undergone the modulation amount addition processing in this embodiment is to preserve tone values which are distributed to uniform densities of an image to be formed as a result of addition of modulation amounts to correction amounts.

Third Example

Next, a case will be described below wherein the misregistration correction processing and halftone processing are applied to image data including pixels which are determined by the specific pattern detector 1005 to have the fine attribute=OFF, as shown in FIGS. 17A to 17D. Assume that image data of an input image is that which solely includes a thin line having a 2-dot width, as shown in FIG. 15A. FIGS.

17A and 17B show results of the misregistration correction processing for a region in which amounts Δy are near 0 (dot) and that in which amounts Δy are near 0.3 (dots) in the image data of such input image. In FIGS. 17A and 17B, pixel values (tone values) of the image data are expressed by numerical values ranging from 0 to 100(%) as in FIGS. 15A to 15E. In this embodiment, as described above, for pixels which are determined to have the fine attribute=OFF, since addition of the modulation amounts to Δy is skipped, the same misregistration correction processing as in the related art is executed.

FIGS. 17C and 17D show results of the halftone processing applied to FIGS. 17A and 17B by the halftone processors 406Y, 406M, 406C, and 406K. In FIGS. 17C and 17D, tone values of respective pixels are expressed by 4-bit values (0 to 15). In a region shown in FIG. 17C, dots having a tone value=15 (100%) are formed to have a 2-dot width. On the other hand, in a region shown in FIG. 17D, dots having tone values=1 to 14 are formed depending on positions in the main scanning direction, and a line width becomes smaller than in FIG. 17C. However, when the thin line having the 2-dot width is solely included in the image to be formed, since unevenness of the line width is not so conspicuous, execution of the aforementioned processing does not result in deterioration of image quality. Also, as for an image such as a photo image or graphic image, which is not a fine image, halftone processing is executed without adding modulation amounts to Δy to assure higher image quality unlike in the above case.

As described above, the image forming apparatus according to this embodiment corrects input image data using misregistration correction amounts Δy for respective pixels in the main scanning direction of a scanning line, which amounts are required to correct a misregistration of an image to be formed caused by deviation of a scanning line of a light beam used to scan the surface of the photosensitive drum from an ideal position on the surface of the photosensitive drum. In this case, the image forming apparatus determines whether or not image data to be corrected using the correction amounts Δy includes a specific pattern which may cause density unevenness in an image to be formed. This specific pattern is a pattern which is regularly repeated in short cycles in an input image. When the image forming apparatus determines that the image data includes the specific pattern, it corrects Δy corresponding to pixels including the specific pattern using any of a plurality of different predetermined modulation amounts (modification values) of the misregistration correction amounts Δy. Furthermore, the image forming apparatus corrects, for each pixel, image data using Δy before modification using the modulation amount or Δy after modification when the modification is done. According to this embodiment, density unevenness caused in an image formed based on input image data can be reduced. As a result, color misregistration upon transferring images of different colors to be superposed on each other can also be reduced.

Note that this embodiment executes the modulation processing using the modulation amount table shown in FIGS. 11A and 11B. However, a cycle, amplitude, and waveform of the modulation are not limited to this table. Also, the modulation amounts may be generated in advance using random numbers. Alternatively, different modulation amount tables may be used for respective colors Y, M, C, and K. When the modulation amount tables different for respective colors are used (for example, when an M modulation amount table prepared by inverting the sign of a C modulation amount table is used), modulations (modifications) for respective colors are relaxed when images to be formed of respective colors are superposed, thus obscuring unevenness more. In this embodiment, the halftone processing is executed after the misregistration correction processing. Alternatively, the halftone processing may be executed before the misregistration correction processing. In this case, the need for selection of the exception processing can be obviated unlike in the above case. Also, the respective processes in this embodiment may be implemented using a logic circuit and the like, or may be implemented when a CPU of the image forming apparatus 10 executes control programs.

Second Embodiment

The second embodiment of the present invention will be described below. This embodiment is characterized in that modulation amounts (modification values) are selected as needed according to a position where a specific pattern exists in image data. Since other processes are the same as those in the first embodiment, a description thereof will not be repeated.

Figure 19:
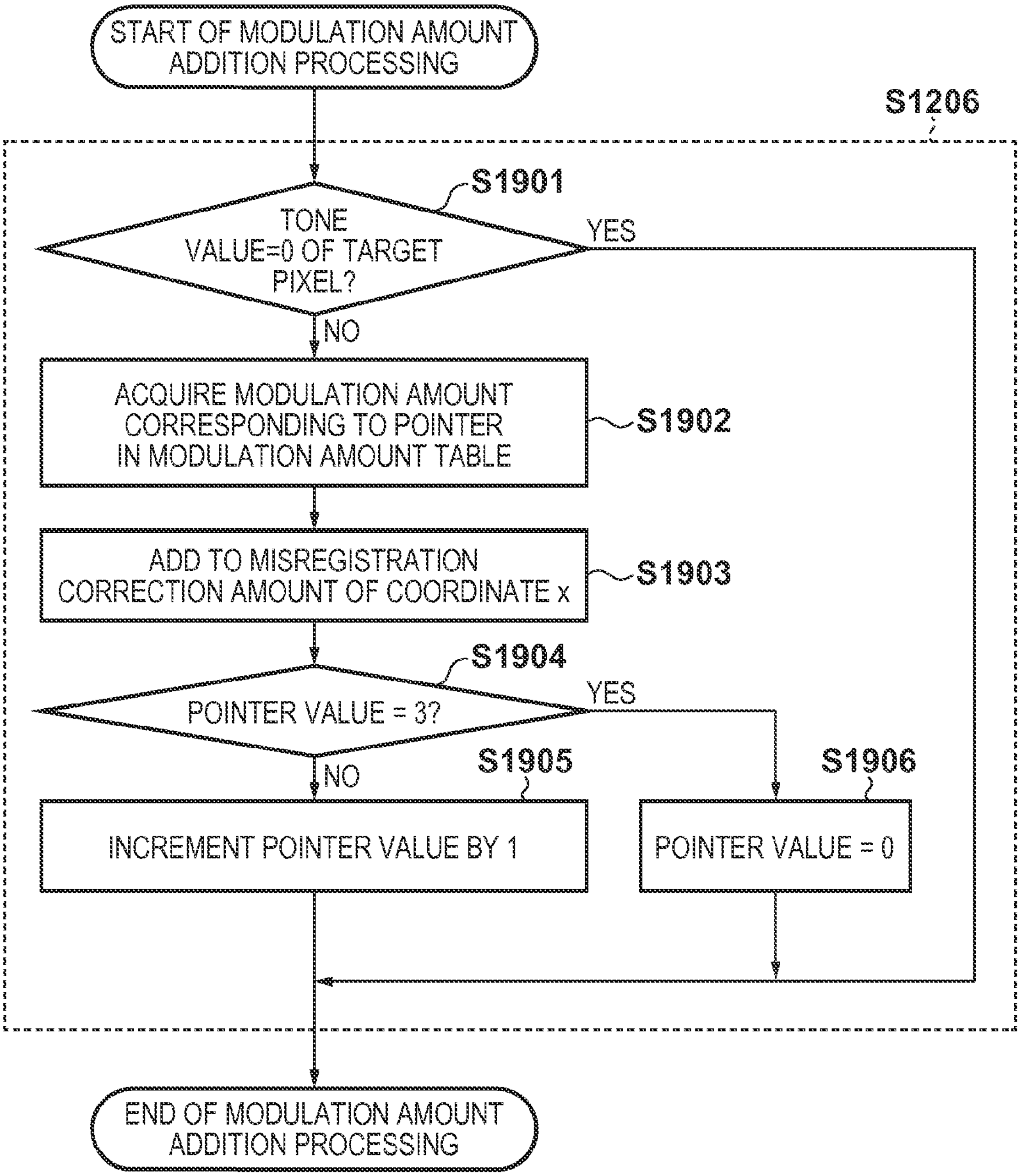
FIG. 19 is a flowchart showing the sequence of modulation amount addition processing according to the second embodiment of the present invention.

FIG. 18 shows a modulation amount table used in this embodiment. The modulation amount table includes data d1 to d4. Each of the data d1 to d4 is given with a pointer indicating its address. The sequence of correction processing in misregistration correction units 403Y, 403M, 403C, and 403K is the same as that in FIG. 12 of the first embodiment. Modulation amount addition processing executed in step S1206 of FIG. 12 will be described below with reference to the flowchart of FIG. 19. Assume that a pointer used in step S1206 is initialized together with a coordinate x in the main scanning direction in step S1203.

If a fine attribute of a target pixel is ON, a modulation amount adder 1006 starts modulation amount addition processing in step S1206. The modulation amount adder 1006 determines in step S1901 whether or not a tone value of the target pixel is 0. If the tone value is 0, the modulation amount addition processing ends. On the other hand, if the tone value is not 0, the process advances to step S1902. The modulation amount adder 1006 acquires data (modulation amount) indicated by the pointer from the data d1 to d4 in the modulation amount table (FIG. 18) in step S1902, and adds it to a misregistration correction amount Δy input from a misregistration correction amount calculator 1002 in step S1903. After that, the modulation amount adder 1006 determines in step S1904 whether or not the address indicated by the pointer is 3. If the address is not 3, the modulation amount adder 1006 increments the pointer value by 1 (step S1905); otherwise, it resets the pointer value to 0 (step S1906).

The effects of misregistration correction processing according to this embodiment will be described below with reference to FIGS. 20A to 20C and FIGS. 21A and 21B. FIG. 20A shows image data of a part of a fine image in which dots are arranged at 2-dot intervals in the main scanning direction. Assume that FIG. 20A is located at the left end of an image region. In the image data shown in FIG. 20A, a modulation amount d1=0 corresponding to a pointer value=0 is selected for a pixel 2001 which is determined to have a fine attribute=ON and has a tone value>0, and the pointer value is incremented to 1. Next, a modulation amount d2=0.5 corresponding to a pointer value=1 is selected for a pixel 2002 which is determined to have a fine attribute=ON and has a tone value>0. Likewise, a modulation amount d3=0 is selected for a pixel 2003, and a modulation amount d4=−0.5 is selected for a pixel 2004. Furthermore, likewise, modulation amounts d1, d2, d3, and d4 are respectively selected for pixels 2005, 2006, 2007, and 2008.

FIG. 20B shows misregistration correction amounts Δy before modulation amount addition at respective pixels in the main scanning direction of FIG. 20A. Also, FIG. 20C shows the addition result of the modulation amounts to the misregistration correction amounts Δy respectively for the pixels 2001 to 2008. As can be seen from FIG. 20C, since tone values of the respective pixels are distributed in the image data, the densities of an image to be formed are locally averaged, thus reducing density unevenness.

Figure 21A:
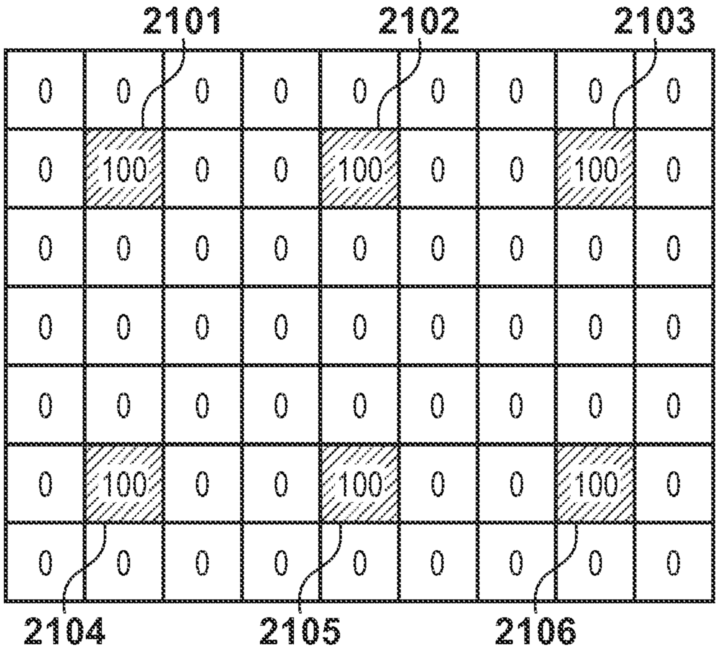
FIGS. 21A and 21B are views showing effects according to the second embodiment of the present invention.

Next, FIG. 21A shows image data of a part of a fine image in which dots are arranged at 3-dot intervals in the main scanning direction. Assume that FIG. 21A is also located at the left end of an image region as in FIG. 20A. A modulation amount d1=0 corresponding to a pointer value=0 is selected for a pixel 2101 as in FIGS. 20A to 20C. Also, a modulation amount d2=0.5 corresponding to a pointer value=1 is selected for a pixel 2102. Likewise, a modulation amount d3=0 corresponding to a pointer value=2 is selected for a pixel 2103. Furthermore, modulation amounts d1, d2, and d3 are respectively selected for pixels 2104, 2105, and 2106.

Figure 21B:
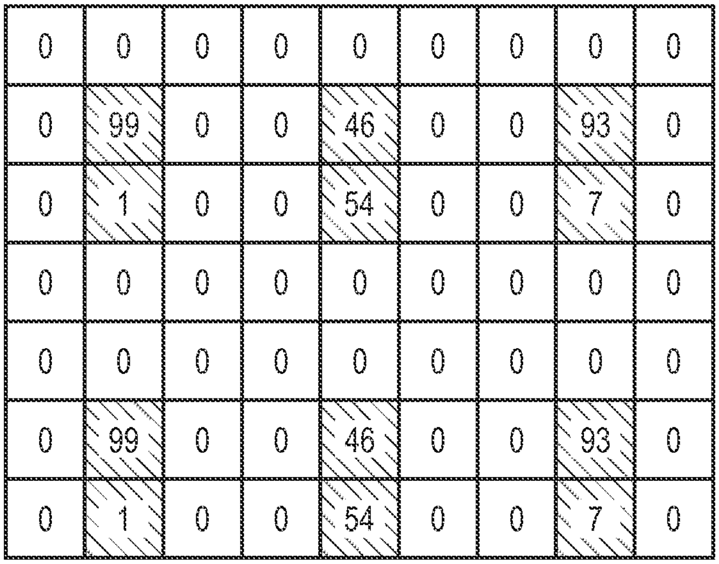

FIG. 21B shows the addition result of the modulation amounts to misregistration correction amounts Δy for the pixels 2101 to 2106 of the respective pixels in the main scanning direction in FIG. 21A. Assume that the misregistration correction amounts Δy before modulation amount addition of the respective pixels in the main scanning direction of FIG. 21A are the same as those in FIG. 20B. As can be seen from FIG. 21B, since tone values of the respective pixels are distributed in the image data, the densities of an image to be formed are locally averaged, thus reducing density unevenness as in FIG. 20C.

As described above, according to this embodiment, since modulation amounts are selected according to positions of dots of a fine image included in an input image, densities are locally averaged irrespective of cycles of dots, thus reducing density unevenness which may occur in an image to be formed.

Other Embodiments

The processing executed by the image processing unit 400 described in the aforementioned embodiments is not limited to the image forming apparatus 10, but it may be executed by a host computer (host PC) which supplies image data required for image formation to the image forming apparatus 10. In this case, this host PC functions as an image processing apparatus of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-087929, filed Apr. 6, 2012, which is hereby incorporated by reference herein in its entirety.

What is claimed is:

1. An image processing apparatus comprising:

a storage unit configured to store correction values for respective pixels in a main scanning direction of a scanning line, the correction values being required to correct a misregistration of an image to be formed by a light beam, which is caused by deviation of the scanning line of a light beam used to scan a surface of a photosensitive member from an ideal position on the surface of the photosensitive member;

a determination unit configured to determine whether or not image data to be corrected using the correction values includes a specific pattern;

a modification unit configured to modify, when the determination unit determines that the image data includes the specific pattern, correction values corresponding to pixels including the specific pattern, of the correction values stored in the storage unit using any of a plurality of different predetermined modification values; and a correction unit configured to correct the image data for respective pixels using the correction values stored in the storage unit or the correction values modified by the modification unit.

2. The apparatus according to claim 1, wherein the correction unit comprises:

a first correction unit configured to correct the misregistration of the image using correction amounts for a one-pixel unit by offsetting, in accordance with the correction values stored in the storage unit or the modified correction values, corresponding pixels in the image data in a sub-scanning direction of the scanning line by the one-pixel unit; and a second correction unit configured to correct the misregistration of the image using correction amounts less than one pixel by respectively adjusting, in accordance with the correction values stored in the storage unit or the modified correction values, pixel values of corresponding pixels in the image data and pixel values of pixels which neighbor the corresponding pixels in the sub-scanning direction.

3. The apparatus according to claim 2, further comprising:

a halftone processing unit configured to apply halftone processing corresponding to a predetermined halftone processing method to pixel values of pixels in the image data which are not modified by the modification unit and are corrected by the correction unit using the correction values stored in the storage unit; and a quantization unit configured to quantize, using a plurality of thresholds at equal intervals, pixel values of pixels in the image data which are corrected by the correction unit using the modified correction values.

4. The apparatus according to claim 3, further comprising a selection unit configured to select whether to use values processed by the halftone processing unit or values quantized by the quantization unit.

5. The apparatus according to claim 1, further comprising:

a halftone processing unit configured to apply halftone processing corresponding to a predetermined halftone processing method to pixel values of pixels in the image data which are not modified by the modification unit and are corrected by the correction unit using the correction values stored in the storage unit; and a quantization unit configured to quantize, using a plurality of thresholds at equal intervals, pixel values of pixels in the image data which are corrected by the correction unit using the modified correction values.

6. The apparatus according to claim 5, further comprising a selection unit configured to select whether to use values processed by the halftone processing unit or values quantized by the quantization unit.

7. The apparatus according to claim 1, wherein the specific pattern is a pattern which is regularly repeated in the image data.

8. The apparatus according to claim 1, wherein the specific pattern is a pattern which causes density unevenness when an image is formed based on image data corrected using the correction values which are not modified by the modification unit.

9. The apparatus according to claim 1, wherein the plurality of modification values are generated in advance using random numbers.

10. The apparatus according to claim 1, wherein the modification unit selects any of the plurality of modification values in accordance with a position, in the main scanning direction, where the specific pattern exists in the image data.

11. A computer-readable storage medium storing a program for causing a computer to function as each unit of an image processing apparatus according to claim 1.

12. An image forming apparatus comprising:

a photosensitive member;

an image processing apparatus configured to correct input image data;

an exposure unit configured to expose a surface of the photosensitive member by scanning a surface of the photosensitive member with a light beam based on the image data corrected by the image processing apparatus; and a developing unit configured to develop an electrostatic latent image formed on the surface of the photosensitive member by exposure of the exposure unit so as to form an image to be transferred to a printing material on the surface of the photosensitive member, wherein the image processing apparatus comprises:

a storage unit configured to store correction values for respective pixels in a main scanning direction of a scanning line, the correction values being required to correct a misregistration of an image to be formed by a light beam, which is caused by deviation of the scanning line of a light beam used to scan a surface of the photosensitive member from an ideal position on the surface of the photosensitive member;

a determination unit configured to determine whether or not image data to be corrected using the correction values includes a specific pattern;

a modification unit configured to modify, when the determination unit determines that the image data includes the specific pattern, correction values corresponding to pixels including the specific pattern, of the correction values stored in the storage unit using any of a plurality of different predetermined modification values; and a correction unit configured to correct the image data for respective pixels using the correction values stored in the storage unit or the correction values modified by the modification unit.

13. A control method of an image processing apparatus, which comprises a storage unit configured to store correction values for respective pixels in a main scanning direction of a scanning line, the correction values being required to correct a misregistration of an image formed by a light beam, which is caused by deviation of the scanning line of a light beam used to scan a surface of a photosensitive member from an ideal position on the surface of the photosensitive member, the method comprising steps of:

determining whether or not image data to be corrected using the correction values includes a specific pattern;

modifying, when it is determined that the image data includes the specific pattern, correction values corresponding to pixels including the specific pattern, of the correction values stored in the storage unit using any of a plurality of different predetermined modification values; and correcting the image data for respective pixels using the correction values stored in the storage unit or the modified correction values.

* * * * *